(12) United States Patent
Lee et al.

(10) Patent No.: US 11,675,658 B2
(45) Date of Patent: Jun. 13, 2023

(54) METHOD AND APPARATUS FOR DECODING SIGNAL IN WIRELESS COMMUNICATION SYSTEM

(71) Applicants: Samsung Electronics Co., Ltd., Suwon-si (KR); Research & Business Foundation SUNGKYUNKWAN UNIVERSITY, Suwon-si (KR)

(72) Inventors: Kwonjong Lee, Suwon-si (KR); Sanghyo Kim, Suwon-si (KR); Hyojin Lee, Suwon-si (KR); Minyoung Chung, Suwon-si (KR); Yongsung Kil, Suwon-si (KR); Seungil Park, Suwon-si (KR); Seunghyun Lee, Suwon-si (KR); Hyunjae Lee, Suwon-si (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 17/407,028

(22) Filed: Aug. 19, 2021

(65) Prior Publication Data
US 2022/0058081 A1    Feb. 24, 2022

(30) Foreign Application Priority Data
Aug. 19, 2020    (KR) .................. 10-2020-0104190

(51) Int. Cl.
*G06F 11/10*    (2006.01)
*G06N 3/02*    (2006.01)
*H04L 1/00*    (2006.01)

(52) U.S. Cl.
CPC ........... *G06F 11/1008* (2013.01); *G06N 3/02* (2013.01); *H04L 1/0047* (2013.01); *H04L 1/0057* (2013.01)

(58) Field of Classification Search
CPC ............ G06F 11/1008; G06F 11/1004; G06N 3/02; H04L 1/0047; H04L 1/0057; H04L 1/08;
(Continued)

(56) References Cited

U.S. PATENT DOCUMENTS 8,166,367 B2    4/2012    Myung et al.
8,176,384 B2    5/2012    Myung et al.
(Continued)

FOREIGN PATENT DOCUMENTS

KR    10-1492634 B1    2/2015
KR    10-1502624 B1    3/2015
(Continued)

OTHER PUBLICATIONS

"IMT Vision—Framework and overall objectives of the future development of IMT for 2020 and beyond, M Series, Mobile, radiodetermination, amateur and related satellite services", Recommendation ITU-R M.2083-0, Sep. 2015, 21 pages.
(Continued)

*Primary Examiner* — Thien Nguyen

(57) ABSTRACT

Provided is a $5^{th}$ generation (5G) or $6^{th}$ generation (6G) communication system for supporting higher data rates after 4G communication systems such as long term evolution (LTE). A communication method of a user equipment (UE) includes receiving, from a base station (BS), information about a decoding mode including bit information corresponding to the number of times of perturbation, receiving data from the BS on a Physical Downlink Shared Channel (PDSCH), and decoding the received data based on the information about the decoding mode, wherein the informa-
(Continued)

tion about the decoding mode may be generated based on service information including at least one of Quality of Service (QoS), a service priority, packet delay performance, packet error probability performance, a requirement, or a data transmission scheme.

10 Claims, 21 Drawing Sheets

(58) Field of Classification Search
CPC ... H04L 1/0023; H04L 1/0039; H04L 5/0044; H03M 13/13; H04W 72/1273
See application file for complete search history.

(56) References Cited

U.S. PATENT DOCUMENTS

| | | | |
|---|---|---|---|
| 8,190,981 | B2 | 5/2012 | Jeong et al. |
| 8,271,846 | B2 | 9/2012 | Myung et al. |
| 2009/0217130 | A1 | 8/2009 | Myung et al. |
| 2017/0026976 | A1* | 1/2017 | Yoo ................... H04W 72/082 |
| 2021/0242885 | A1* | 8/2021 | Kim .................. H03M 13/1575 |

FOREIGN PATENT DOCUMENTS

| | | |
|---|---|---|
| KR | 10-1503058 B1 | 3/2015 |
| KR | 10-1503059 B1 | 3/2015 |
| KR | 10-1554064 B1 | 9/2015 |

OTHER PUBLICATIONS

Ji et al., "Ultra-Reliable and Low-Latency Communications in 5G Downlink: Physical Layer Aspects", IEEE Wireless Communications, Jun. 2018, 7 pages.
Sybis et al., "Channel coding for ultra-reliable low-latency communication in 5G systems", 2016 IEEE, 5 pages.
Shirvanimoghaddam et al., "Short Block-length Codes for Ultra-Reliable Low Latency Communications", Sep. 5, 2018, 8 pages.
Richardson et al., "The Capacity of Low-Density Parity-Check Codes Under Message-Passing Decoding", IEEE Transactions on Information Theory, vol. 47, No. 2, Feb. 2001, 20 pages.
Yue et al., "Analysis and Design of Finite-Length LDPC Codes", IEEE Transactions on Vehicular Technology, vol. 56, No. 3, May 2007, 12 pages.
Xiao et al., "A Perturbation Method for Decoding LDPC Concatenated with CRC", IEEE, 2007, 5 pages.
Baek et al., "Decoding LDPC Codes with Binary Perturbation", IEEE, 2016, 3 pages.
Scholl et al., "Saturated Min-Sum Decoding: An "Afterburner" for LDPC Decoder Hardware", EDAA, 2016, 6 pages.
Kang et al., "Enhanced Quasi-Maximum Likelihood Decoding of Short LDPC Codes based on Saturation", Jan. 30, 2019, 6 pages.
Myung et al., "Offset and Normalized Min-Sum Algorithms for ATSC 3.0 LDPC Decoder", IEEE Transactions on Broadcasting, 2017, 6 pages.
"Channel Codes", Technische Universitat Kaiserslautern, 2017, 2 pages.

* cited by examiner

METHOD AND APPARATUS FOR DECODING SIGNAL IN WIRELESS COMMUNICATION SYSTEM

CROSS-REFERENCE TO RELATED APPLICATION

This application is based on and claims priority under 35 U.S.C. § 119 to Korean Patent Application No. 10-2020-0104190 filed on Aug. 19, 2020, in the Korean Intellectual Property Office, the disclosure of which is incorporated by reference herein in its entirety.

BACKGROUND

1. Field

Embodiments of the disclosure relate to a method and apparatus for decoding signals in a wireless communication system.

2. Description of Related Art

Considering the development of wireless communication from generation to generation, the technologies have been developed mainly for services targeting humans, such as voice calls, multimedia services, and data services. Following the commercialization of 5th-generation (5G) communication systems, it is expected that the number of connected devices may exponentially grow. Increasingly, these may be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6th-generation (6G) era, there have been ongoing efforts to develop improved 6G communication systems. For these reasons, 6G communication systems are referred to as beyond-5G systems.

6G communication systems, which are expected to be commercialized around 2030, may have a peak data rate of tera (1,000 giga)-level bps and a radio latency less than 100 μsec, and thus may be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) may become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), may allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

SUMMARY

According to an embodiment of the disclosure, a method and apparatus for decoding signals in a wireless communication system are provided for a receiver to be able to effectively decode signals while satisfying service requirements.

Additional aspects will be set forth in part in the description which follows and, in part, will be apparent from the description, or may be learned by practice of the presented embodiments of the disclosure.

According to an embodiment of the disclosure, a user equipment (UE) for decoding signals in a wireless communication system may be provided. The UE may include a transceiver; and at least one processor, wherein the at least one processor may control the transceiver to receive information about a decoding mode including bit information corresponding to the number of perturbations from a base station (BS), control the transceiver to receive, from the BS, data on a physical downlink shared channel (PDSCH), and decode the received data based on the information about the decoding mode, wherein the information about the decoding mode may be generated based on service information including at least one of quality of service (QoS), a service priority, packet delay performance, packet error probability performance, a requirement, or a data transmission scheme.

In one embodiment of the disclosure, the at least one processor may control the transceiver to transmit at least one of UE capability information or channel state information to the BS, wherein the information about the decoding mode may be generated by the BS based on the at least one of the UE capability information or the channel state information.

In one embodiment of the disclosure, the at least one processor may perform decoding by repeatedly performing as many perturbations as the number of perturbations corresponding to the bit information.

In one embodiment of the disclosure, the UE capability information may include at least one of information about whether the UE includes a perturbation decoder or the maximum number of available perturbation rounds that the UE is able to perform.

In one embodiment of the disclosure, the at least one processor may determine that decoding has failed, perform perturbation on at least one bit determined by using an artificial neural network, as a result of the determination that the decoding has failed, and perform the decoding based on a result of performing the perturbation.

In one embodiment of the disclosure, the at least one processor may, after performing cyclic redundancy check (CRC) or decoding of a regular low-density parity check code (LDPC) code using the received data and as a result, determining that the decoding has failed, obtain the data for which the decoding has failed, and the artificial neural network may be trained by adding an index value to a position of a bit on which decoding has been successful as a result of performing impulsive perturbation on at least one bit of the data for which the decoding has failed.

In one embodiment of the disclosure, the at least one processor may, after performing CRC check or decoding of an irregular LDPC code using the received data and determining that the decoding has failed, obtain the data for which the decoding has failed, and perform impulsive perturbation on at least one bit of the data on which the decoding has failed, and determine a reference value to be compared with an order of a variable node based on a structure of the irregular LDPC code, and the artificial neural network may be trained by adding an index value determined according to a result of comparison between the order of the variable node and the reference value to a position of a bit on which the decoding has been successful as a result of performing impulsive perturbation on at least one bit of the data for which decoding has failed.

According to another embodiment of the disclosure, a method of UE decoding signals in a wireless communication system may be provided. The method may include receiving information about a decoding mode including bit information corresponding to the number of perturbations from a BS, receiving data from the BS on a PDSCH, and decoding the received data based on the information about the decoding mode, wherein the information about the decoding mode may be generated based on service information including at least one of QoS, a service priority, packet delay performance, packet error probability performance, a requirement, or a data transmission scheme.

In one embodiment of the disclosure, the method may further include transmitting at least one of UE capability information or channel state information to the BS, wherein the information about the decoding mode may be generated by the BS based on the at least one of the UE capability information or the channel state information.

In one embodiment of the disclosure, the UE capability information may include at least one of information about whether the UE includes a perturbation decoder, or the maximum number of available perturbation rounds that the UE is able to perform.

In one embodiment of the disclosure, the method may include performing decoding by repeatedly performing as many perturbations as the number of perturbations corresponding to the bit information.

In one embodiment of the disclosure, the decoding may include determining that the decoding has failed; performing perturbation on at least one bit determined by using an artificial neural network, as a result of the determination that the decoding has failed; and performing the decoding based on a result of performing the perturbation.

In one embodiment of the disclosure, the determining that the decoding has failed may include, after performing CRC check or decoding of a regular LDPC code using the received data and as a result, determining that the decoding has failed, obtaining the data for which the decoding has failed, and the artificial neural network may be trained by adding an index value to a position of a bit on which decoding has been successful as a result of performing impulsive perturbation on at least one bit of the data for which decoding has failed.

In one embodiment of the disclosure, the determining that the decoding has failed may include, after performing CRC check or decoding of an irregular LDPC code using the received data and as a result, determining that the decoding has failed, obtaining the data for which the decoding has failed, the method may further include performing impulsive perturbation on at least one bit of the data on which the decoding has failed; and determining e a reference value to be compared with an order of a variable node based on a structure of the irregular LDPC code, and the artificial neural network may be trained by adding an index value determined according to a result of comparison between the order of the variable node and the reference value to a position of a bit on which the decoding has been successful as a result of performing impulsive perturbation on at least one bit of the data for which decoding has failed.

According to another embodiment of the disclosure, a BS for transmitting data to a UE in a wireless communication system may be provided. The BS may include a transceiver; and at least one processor, wherein the at least one processor may generate information about a decoding mode including bit information corresponding to the number of perturbations, control the transceiver to transmit, to the UE, the information about the decoding mode including the bit information corresponding to the number of perturbations, control the transceiver to transmit, to the UE, data on a PDSCH, and wherein the information about the decoding mode may be generated based on service information including at least one of QoS, a service priority, packet delay performance, packet error probability performance, a requirement, or a data transmission scheme.

In an embodiment of the disclosure, the at least one processor may control the transceiver to receive at least one of UE capability information or channel state information from the UE, wherein the information about the decoding mode may be generated based on the at least one of the UE capability information or the channel state information.

In one embodiment of the disclosure, the UE capability information may include at least one of information about whether the UE includes a perturbation decoder, or the maximum number of available perturbation rounds that the UE is able to perform.

According to another embodiment of the disclosure, a method of BS transmitting data to a UE in a wireless communication system may be provided. The method may include generating information about a decoding mode including bit information corresponding to the number of perturbations; transmitting, to the UE, the information about the decoding mode including the bit information corresponding to the number of perturbations; and transmitting data to the UE on a PDSCH, and wherein the information about the decoding mode may be generated based on service information including at least one of QoS, a service priority, packet delay performance, packet error probability performance, a requirement, or a data transmission scheme.

In one embodiment of the disclosure, the method may further include receiving at least one of UE capability information or channel state information from the BS, and the generating of the information about the decoding mode may include generating the information about the decoding mode based on the at least one of the UE capability information or the channel state information.

In one embodiment of the disclosure, the UE capability information may include at least one of information about whether the UE includes a perturbation decoder, or the maximum number of available perturbation rounds that the UE is able to perform.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
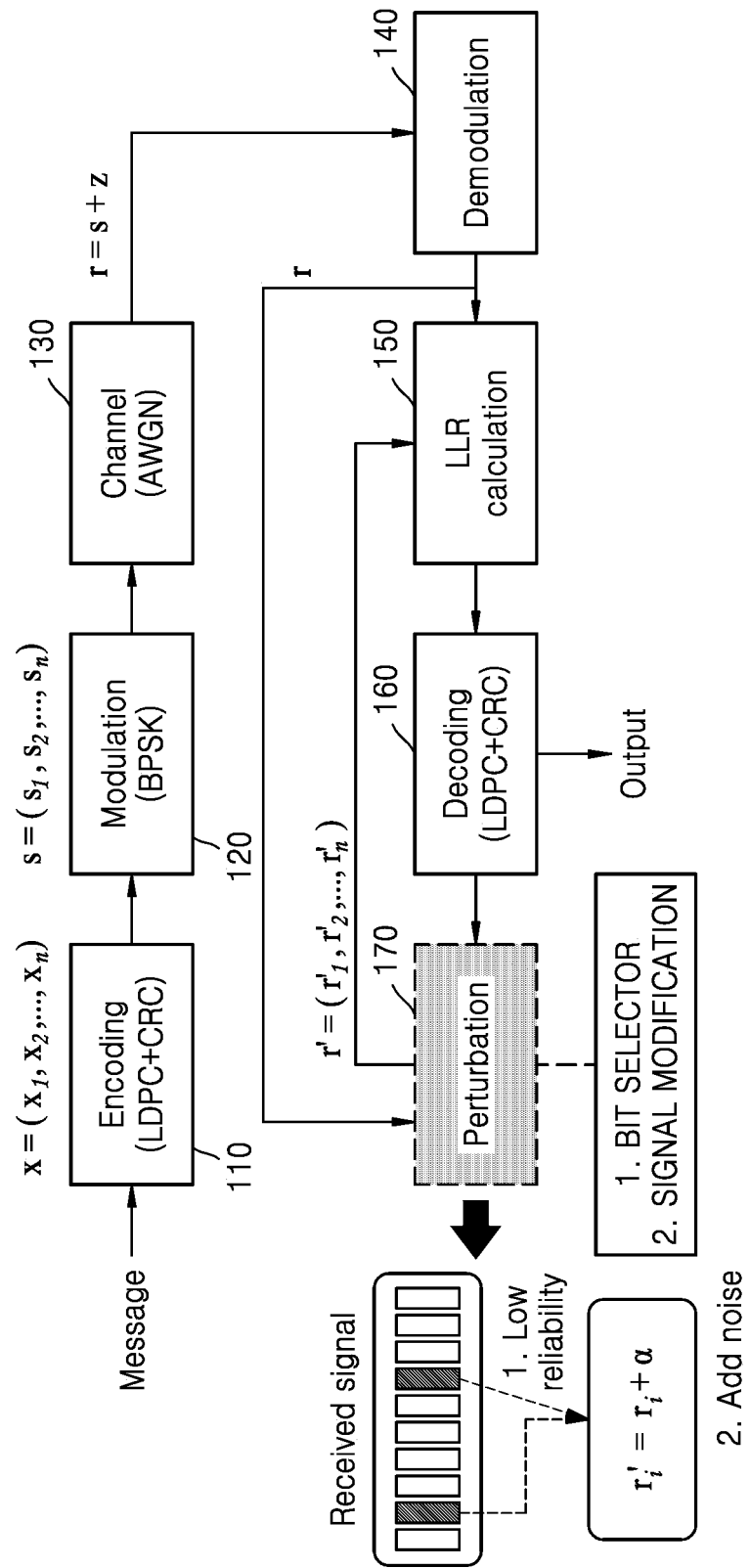
FIG. 1 is a block diagram illustrating a procedure in which a transmitter encodes a message to transmit a signal and a receiver decodes the signal, according to an embodiment of the disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Operating principles of embodiments of the disclosure will now be described with reference to accompanying drawings. Descriptions of some well-known technologies that possibly obscure the disclosure will be omitted, if necessary. Further, the terms, as will be mentioned later, are defined by taking functionalities in the disclosure into account, but may vary depending on practices or intentions of users or operators. Accordingly, the terms should be defined based on descriptions throughout this specification. Herein, the terms to identify access nodes, the terms to refer to network entities, the terms to refer to messages, the terms to refer to interfaces among network entities, the terms to refer to various types of identification information, etc., are examples for convenience of explanation. Accordingly, the disclosure is not limited to the terms as herein used, and may use different terms to refer to the items having the same meaning in a technological sense.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Advantages and features of the disclosure, and methods for attaining them will be understood more clearly with reference to the following embodiments of the disclosure, which will be described in detail later along with the accompanying drawings. Embodiments of the disclosure may, however, be embodied in many different forms and should not be construed as limited to embodiments set forth herein; rather, these embodiments of the disclosure are provided so that this disclosure will be thorough and complete, and will fully convey the scope of embodiments of the disclosure to those of ordinary skill in the art. Like numbers refer to like elements throughout the specification.

It will be understood that each block and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-executable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a greater number of components and modules. Moreover, the components and modules may be implemented to execute one or more central processing units (CPUs) in a device or security multimedia card. In embodiments of the disclosure, the module may include one or more processors.

Descriptions of some well-known technologies that possibly obscure the disclosure will be omitted, if necessary. Embodiments of the disclosure will now be described with reference to accompanying drawings.

Herein, terms to identify access nodes, terms to refer to network entities, terms to refer to messages, terms to refer to interfaces among network entities, terms to refer to various types of identification information, etc., are examples for convenience of explanation. Accordingly, the disclosure is not limited to the terms as herein used, and may use different terms to refer to the items having the same meaning in a technological sense.

Some of the terms and names defined by the 3rd generation partnership project (3GPP) long term evolution (LTE) may be used hereinafter. The disclosure is not, however, limited to the terms and definitions, and may equally apply to any systems that conform to other standards. In the disclosure, eNode B (eNB) may be interchangeably used with gNode B (gNB). For example, a base station referred to as an eNB may also indicate a gNB. Furthermore, the term 'terminal' or 'user equipment (UE)' may refer not only to a cell phone, an NB-IoT device, and a sensor but also to another wireless communication device.

In the following description, a base station is an entity for performing resource allocation for a terminal, and may be at least one of a gNB, an eNB, a Node B, a base station (BS), a radio access unit, a base station controller, or a network node. The terminal may include a UE, a mobile station (MS), a cellular phone, a smart phone, a computer, or a multimedia system capable of performing a communication function. It is, of course, not limited thereto.

Especially, the disclosure may be applied to the 3GPP new radio (NR) (which is the 5G mobile communication standard). The disclosure may be applied to intelligent services based on the 5G communication and IoT related technologies, e.g., smart home, smart building, smart city, smart car, connected car, health care, digital education, smart retail, security and safety services. In the disclosure, eNB may be interchangeably used with gNB. For example, a base station referred to as an eNB may also indicate a gNB. Furthermore, the term 'terminal' or 'UE' may refer not only to a cell phone, an NB-IoT device, and a sensor but also to another wireless communication device.

Wireless communication systems are evolving from early systems that provide voice-oriented services to broadband wireless communication systems that provide high data rate and high quality packet data services such as 3GPP high speed packet access (HSPA), long term evolution (LTE) or evolved universal terrestrial radio access (E-UTRA), LTE-advanced (LTE-A), LTE-Pro, 3GPP2 high rate packet data (HRPD), ultra mobile broadband (UMB), and IEEE 802.16e communication standards.

As a representative example of such a broadband wireless communication system, an LTE system adopts orthogonal frequency division multiplexing (OFDM) for downlink (DL) and single carrier frequency division multiple access (SC-FDMA) for uplink (UL). The UL refers to a radio link for a UE or MS to send data or a control signal to an eNode B or BS, and the DL refers to a radio link for a BS to send data or a control signal to a UE or MS. Such a multiple access scheme allocates and operates time-frequency resources for carrying data or control information for respective users not to overlap each other, i.e., to maintain orthogonality, thereby differentiating each user's data or control information.

As a future communication system after the LTE, the 5G communication system needs to freely reflect various demands from users and service providers and thus support services that simultaneously meet the various demands. The services considered for the 5G communication system may include enhanced Mobile Broadband (eMBB), massive Machine Type Communication (mMTC), Ultra Reliability Low Latency Communication (URLL), etc.

In some embodiments, the eMBB is aimed at providing more enhanced data rates than the LTE, LTE-A or LTE-Pro may support. For example, in the 5G communication system, the eMBB is required to provide 20 Gbps peak data rate in DL and 10 Gbps peak data rate in UL in terms of a single BS. Furthermore, the 5G communication system may need to provide increasing user perceived data rate while providing the peak data rate. To satisfy these requirements, enhancement of various technologies for transmission or reception including multiple-input multiple-output (MIMO) transmission technologies may be required in the 5G communication system. While the present LTE uses up to 20 MHz transmission bandwidth in the 2 GHz band for signal transmission, the 5G communication system may use frequency bandwidth wider than 20 MHz in the 3 to 6 GHz band or in the 6 GHz or higher band, thereby satisfying the data rate required by the 5G communication system.

At the same time, in the 5G communication system, mMTC is considered to support an application service such as an Internet of Things (IoT) application service. In order for the mMTC to provide the IoT efficiently, support for access from massive number of terminals in a cell, enhanced coverage of the terminal, extended battery time, reduction in terminal price, etc., may be required. Because the IoT is equipped in various sensors and devices to provide communication functions, it may be supposed to support a large number of UEs in a cell (e.g., 1,000,000 terminals/km$^2$). Furthermore, a terminal supporting the mMTC is more likely to be located in a shadow area, such as underground of a building, which may not be covered by a cell by the nature of the service, so the mMTC may require an even larger coverage than expected for other services provided by the 5G communication system. A terminal supporting the mMTC needs to be a low-cost terminal, and may require quite long battery lifetime such as 10 to 15 years because the battery in the terminal is hard to be changed frequently.

Finally, the URLLC may be a mission-critical cellular based wireless communication service, which may be used for services used for remote control over robots or machinery, industrial automation, unmanned aerial vehicle, remote health care, emergency alert, etc. Accordingly, communication offered by the URLLC may require very low latency (ultra low latency) and very high reliability. For example, URLCC services may need to satisfy sub-millisecond (less than 0.5 millisecond) air interface latency and simultaneously require a packet error rate equal to or lower than $10^{-5}$. Hence, for the URLLC services, the 5G system needs to provide a smaller transmit time interval (TTI) than for other services, and simultaneously requires a design that allocates a wide range of resources for a frequency band to secure reliability of the communication link.

Those three services considered in the aforementioned 5G communication system, i.e., eMBB, URLLC, and mMTC, may be multiplexed and transmitted from a single system. In this case, to meet different requirements for the three services, transmission or reception schemes and parameters which are different according to the services may be used. The mMTC, URLLC, and eMBB are an example of different types of services, and embodiments of the disclosure are not limited to the service types. Some of the terms and names defined by the 3rd generation partnership project (3GPP) long term evolution (LTE) may be used hereinafter. The disclosure is not, however, limited to the terms and definitions, and may equally apply to any systems that conform to other standards. Although the following embodiments of the disclosure will now be focused on an LTE, LTE-A, LTE Pro or 5G (or NR, next generation mobile communication) system for example, they may be equally applied to other communication systems with similar technical backgrounds or channel types. Furthermore, embodiments of the disclosure may also be applied to different communication systems with some modifications to such an extent that does not significantly deviate from the scope of the disclosure when judged by those of ordinary skill in the art.

Various channel encoding technologies are being studied to support services that satisfy various requirements simultaneously. To satisfy a high reliability condition in particular, a channel encoding technology of good performance is required. For example, for a channel encoding technology used in the 5G communication system, there are polar codes, low-density parity check (LDPC) codes, etc. The LDPC codes are used to describe an embodiment of the disclosure as shown in FIG. 1, which is, however, equally applied to other channel encoding technologies such as polar codes. The LDPC codes are channel codes that attain Shannon's channel capacity, having good error correction capability and allowing low latency decoding with parallel hardware implementations. Accordingly, many different fields such as mobile communication and digital broadcasting are now using the LDPC codes for channel codes. For example, the LDPC codes have been adopted as channel codes for data transmission in eMBB of the 5G communication system. Various methods for decoding the LDPC codes may be used. For example, a brief propagation (BP) decoding technique may be applied to attain better performance. The BP decoding technique is a technique for estimating a transmitted codeword on a bipartite graph by repeatedly exchanging information received on a channel between variable nodes and check nodes The BP decoding has better performance the longer the length of the LPDC code, but the performance may be degraded a little for a short length of the LPDC code. Hence, in URLLC communication, a normal BP decoding technique for decoding of short LDPC codes may meet a latency requirement but may hardly satisfy a confidence requirement. Accordingly, to solve high error probability problems of the LDPC codes with short length as in multi-round BP perturbation decoding (MBPPD), various decoding and post-processing technologies are required.

In an embodiment of the disclosure, perturbation may refer to a procedure of modifying a bit with low confidence of a received signal. The MBPPD technique may be a technique that repeats the perturbation procedure until a valid codeword is discovered when LDPC BP decoding or cyclic redundancy check (CRC) check has failed. With the MBPPD technique, as the number of repetitive perturbations increases, the performance is enhanced but at the same time, complexity and latency may increase as well. Hence, a new technique to reduce complexity and latency while maintaining decoding performance is required for practically using a perturbation decoder.

In the disclosure, transmission and reception technologies that may support many different receptions and decoding performance required depending on the service are provided. Specifically, in the disclosure, an operation method is provided, in which normal decoding is performed for a service for which latency is considered more important than the decoding error probability, and MBPDP based high performance decoding is performed for a service that gives higher priority to the decoding error probability performance than to the latency. Furthermore, in the disclosure, an efficient perturbation region selection method that may use an artificial neural network to reduce the number of perturbation decoding rounds is provided.

FIG. 1 is a block diagram illustrating a procedure in which a transmitter encodes a message to transmit a signal and a receiver decodes the signal, according to an embodiment of the disclosure.

Referring to FIG. 1, an encoding performer 110 of a transmitter may encode a message. The encoding performer 110 may generate a binary LDPC code having a systematic structure with a code length of n and a message length of k. Furthermore, the encoding performer 110 may add a CRC bit. As a result, the encoding performer 110 may generate a codeword $x=(x_1, x_2, \ldots, x_n)$.

In an embodiment of the disclosure, various modulation schemes may be used by a modulation performer 120 to the generated codeword $x=(x_1, x_2, \ldots, x_n)$. For example, binary phase shift keying (BPSK) may be applied, but the modulation scheme is not limited thereto and other various modulation schemes such as quadrature phase shift keying (QPSK), quadrature amplitude modulation (QAM), etc., may also be applied. The modulation performer 120 may use a suitable modulation scheme to generate a symbol $s=(s_1, s_2, \ldots, s_n)$, to which the modulation scheme is applied.

In an embodiment of the disclosure, the transmitter may transmit the symbol $s=(s_1, s_2, \ldots, s_n)$, to which the modulation scheme is applied, to a receiver on a transmission channel 130. The receiver may then receive a signal r=s+z, which is the symbol to which the modulation scheme is applied, plus noise from the transmission channel 130. For example, the transmission channel 130 may be an additive white Gaussian noise (AWGN) channel. In this case, z may be a Gaussian noise vector with dimension n, mean 0, and variance $\sigma^2$.

In an embodiment of the disclosure, a demodulation performer 140 of the receiver may demodulate the received signal and transmit the demodulated signal to a long likelihood ratio (LLR) calculation performer 150 and a perturbation performer 180.

In an embodiment of the disclosure, the LLR calculation performer 150 may calculate an LLR of the received signal and generate $l=(l_1, l_2, \ldots, l_n)$. Furthermore, a decoding performer 160 may output a final signal when decoding is successful, or may deliver the signal to the perturbation performer 180 when the decoding is not successful.

In an embodiment of the disclosure, the perturbation performer 180 may perform at least one perturbation procedure for the signal for which the decoding has failed. For example, the perturbation performer 180 may select a bit to be subject to perturbation, and perform the perturbation procedure by modifying a signal of the selected bit. In an embodiment of the disclosure, the bit to be subject to perturbation may be a signal with low confidence, and the perturbation performer 180 may modify the signal by adding noise to the bit to be subject to perturbation.

In an embodiment of the disclosure, a binary LDPC code may be defined by a parity-check matrix, H, which is a sparse binary matrix with dimension (n−k)×n and for an arbitrary codeword $c=(c_1, c_2, \ldots, c_n)$ of the LDPC code, relations $HC^T=0$ may be satisfied. The parity-check matrix H has a very small number of elements is for the dimension, so it may be described as having low density. The parity-check matrix H may be represented by a bipartite graph comprised of variable nodes and check nodes. The bipartite graph may be comprised of a set $V=(v_1, v_2, \ldots, v_n)$ of variable nodes, a set $Q=(q_1, q_2, \ldots, q_m)$ of check nodes, and a set E of edges connecting the variable nodes and the check nodes. In H, when a value of an element in i-th row and j-th column is "1," the i-th variable node $v_i$ and the j-th check node $q_j$ may be connected by an edge to each other. The set of variable nodes and the set of check nodes may correspond to columns and rows of the parity-check matrix, respectively, and the variable nodes may be represented by the respective bits of a codeword, and the check nodes may be represented by linear binary constraints.

In an embodiment of the disclosure, MBPPD is a technique that applies a perturbation technique to select and modify a received signal with low confidence when decoding using e.g., a CRC code concatenated with an LDPC code fails, and performs decoding again using the modified signal. In this case, the perturbation procedure may be repeatedly performed until a valid codeword is discovered. For example, the valid codeword may refer to a codeword satisfying a syndrome of the LDPC code ($H\hat{c}=0$) and a codeword satisfying CRC check. The concatenated CRC code in MBPPD may perform a role of early termination of the perturbation repetition procedure. When it is not concatenated with the CRC code, codewords satisfying the syndrome of the LDPC code may be stored by performing as many perturbations as the maximum number of perturbation rounds, and ML performance comparison between the stored codewords may be made to select a final codeword with the best performance.

In an embodiment of the disclosure, the perturbation technique may include an operation of determining a perturbation region, an operation of generating a perturbation pattern, an operation of modifying a signal, etc. The operation of determining a perturbation region and the operation of modifying a signal may produce significantly enhanced decoding results depending on a combination of the corresponding methods, and error probability performance and complexity may also be improved depending on the operation method. Taking this into account, the operation of determining a perturbation region may be described in connection with FIG. 2A, and the operation of modifying a signal may be described in connection with FIG. 2B.

Figure 2A:
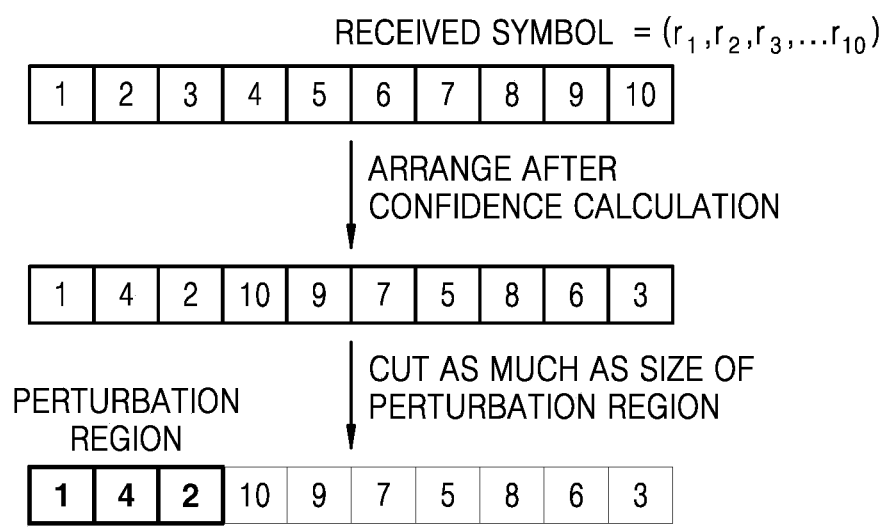
FIG. 2A is a block diagram illustrating a procedure of determining a perturbation region, according to an embodiment of the disclosure.

FIG. 2A is a block diagram illustrating a procedure of determining a perturbation region, according to an embodiment of the disclosure.

In an embodiment of the disclosure, a perturbation region refers to a set of indexes of bits to be modified by adding noise, from a received signal. Accordingly, the operation of determining a perturbation region may refer to a procedure of selecting bits to be subject to perturbation. The perturbation region may be determined after first decoding failure. The perturbation region may be kept the same in a procedure of repeatedly performing perturbation or may be renewed for every perturbation round.

Referring to FIG. 2A, perturbation bits may be generated by firstly arranging indexes of a received symbol in an order of having less confidence and cutting a set of the arranged indexes as large as a predetermined size. In an embodiment of the disclosure, when a received symbol has 10 bits, confidence may be calculated for each bit, and the bits may be arranged in an order of having less confidence. The perturbation region may be determined by cutting the set of arranged indexes as large as the predetermined size. For example, the perturbation region may be determined by cutting 3 bits in an order of having less confidence out of the 10 bits, but determination of the perturbation region is not limited thereto.

In an embodiment of the disclosure, confidence may be estimated using an intrinsic log-likelihood ratio (LLR) value of the received signal or a by-product from the BP decoding procedure. The by-product from the BP decoding procedure may be, for example, a message size/sign, syndrome status, or the like, without being limited thereto.

In an embodiment of the disclosure, a perturbation pattern may refer to a set of finite indexes of bits to be modified from the received signal in the selected perturbation region. For example, as shown in FIG. 2A, for a codeword having a length of 10 bits, a perturbation region corresponds to (1, 2, 4), and when up to 3 bits of the signal are to be subject to perturbation, perturbation patterns that may be generated may be {{1}, {2}, {4}, {1, 2}, {1, 4}, {2, 4}, {1, 2, 4}}.

Figure 2B:
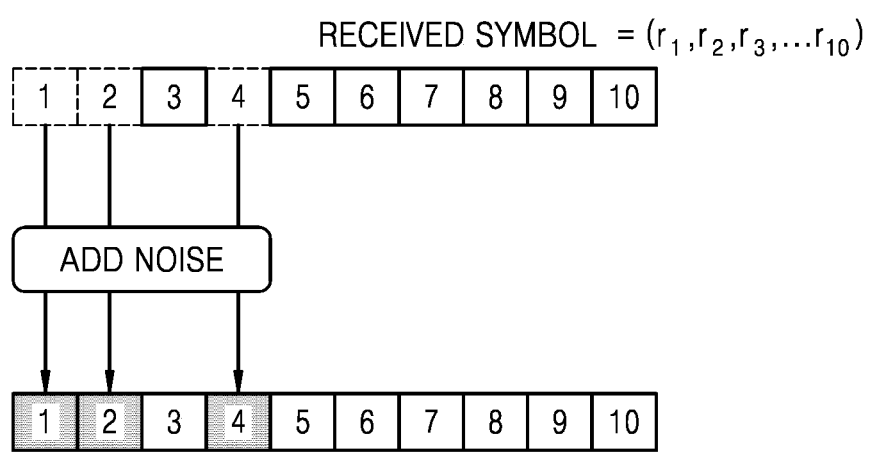
FIG. 2B is a block diagram illustrating a procedure of modifying a signal in perturbation, according to an embodiment of the disclosure.

FIG. 2B is a block diagram illustrating a procedure of modifying a signal in perturbation, according to an embodiment of the disclosure.

Referring to FIG. 2B, the received signal may be modified based on a determined perturbation region and perturbation pattern. In other words, a signal modification procedure may be a procedure of modifying a received signal based on selected perturbation bits and a perturbation pattern. Signal modification is to add various types of noise to the bit selected according to the perturbation pattern, so the symbols that do not belong to the perturbation region may have the same values as in the received signal. An LLR value may be further calculated for the modified signal, and accordingly, a re-decoding procedure may be performed repeatedly. For example, when the perturbation region is determined to be (1, 2, 4) and the perturbation pattern is determined to be {1, 2, 4} as described above in connection with FIG. 2A, the signal may be modified by adding noise to bits corresponding to {1, 2, 4}. Other bits {3, 5, 6, 7, 8, 9, 10} than the bits corresponding to {1, 2, 4} may have the same values as in the received signal.

In an embodiment of the disclosure, performance and complexity for a perturbation decoder have a trade-off relation. Specifically, the more the number of perturbations, the better the performance but the higher the complexity, and the less the number of perturbations, the lower the complexity but the worse the performance. Hence, for efficient UE operation, a method of flexibly determining a decoding scheme of the UE based on a service and a transmission condition instead of performing perturbation decoding each time is required.

An embodiment of the disclosure provides a method of effectively operating the receiver's decoding operation based on service information (e.g., a type of the service, importance of the service, a requirement, a service priority, a packet delay requirement, a packet error probability performance requirement, etc.), channel state information (e.g., a signal-to-noise ratio (SNR), a signal-to-interference-plus-noise ratio (SINR), etc.), UE capability information (e.g., information about whether the UE includes a perturbation decoder, the maximum number of perturbation rounds that the UE may be able to perform, etc.), information about a transmission scheme such as unicasting, multicasting, etc. In an embodiment of the disclosure, instead of performing perturbation decoding to the maximum regardless of conditions, decoding operation may be flexibly determined based on information about various communication data, service information, UE information, etc. A method of determining a decoding mode, which will be described later, may be equally applied to any decoding schemes, and may be expanded even to various post-processing technologies provided to improve decoding performance. The disclosure is focused on perturbation decoding as an example.

Figure 3:
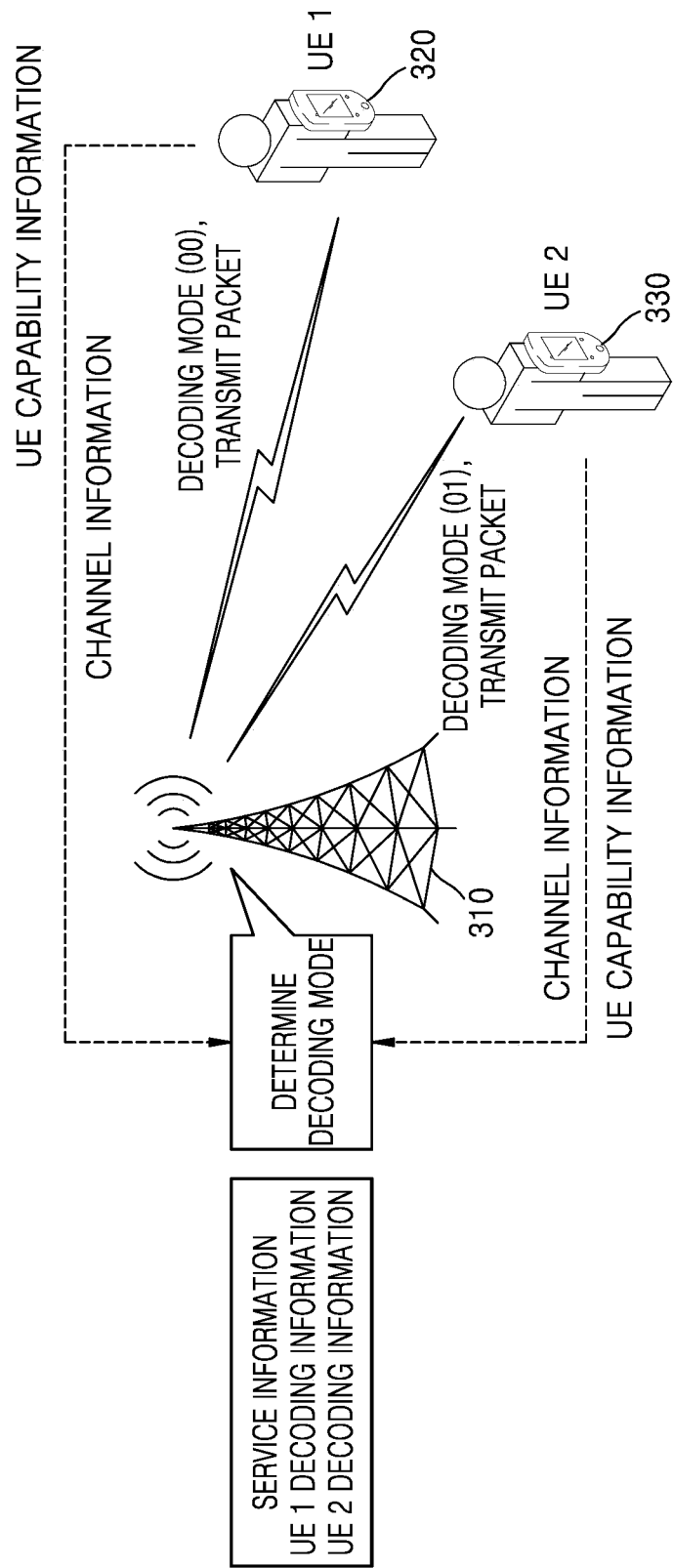
FIG. 3 illustrates a method of transmission and reception of signals between a base station (BS) and user equipment (UE) to determine a decoding mode in a wireless communication system, according to an embodiment of the disclosure.

FIG. 3 illustrates a signal transmission and reception method between a BS and UE to determine a decoding mode in a wireless communication system, according to an embodiment of the disclosure.

Referring to FIG. 3, when a UE is connected to a BS in a 3GPP 5G NR system, the BS may transmit a radio resource control (RRC) message including UECapabilityEnquiry.

In an embodiment of the disclosure, the UE may transmit, to the BS, UE capability information (e.g., UECapabilityInformation) according to a UE capability parameter. The "UE capability parameter" may include a physical layer parameter and may be variously subdivided. In an embodiment of the disclosure, the UE may add perturbation decoding capability information of the UE to the physical layer parameter item, and may transmit, to the BS, the "UE capability parameter" including the perturbation decoding capability information. For example, the UE capability information (e.g., UECapabilityInformation) may include information about whether the UE includes a perturbation decoder, the maximum number of perturbation rounds that the UE may be able to perform, etc., without being limited thereto. In an embodiment of the disclosure, UEs 320 and 330 may transmit only the UE capability information, or only the channel state information obtained by the UE through channel feedback and sounding, or both to the BS 310.

The BS 310 may determine information about a decoding mode based on the UE capability information, the channel state information or the like, from the UEs 320 and 330. The information about the decoding mode may be generated based on service information including at least one of quality of service (QoS), a service priority, packet delay performance, packet error probability performance, a requirement, or a data transmission scheme. After determining the decoding mode for each communicating UE based on the received information, the BS may transmit the information about the decoding mode to a UE corresponding to the receiver. In this case, the information about the decoding mode may be added to a control signal including a modulation and coding scheme (MCS) parameter of the packet, and then transmitted to the UE from the BS. In an embodiment of the disclosure, the information about the decoding mode will be described later in connection with FIG. 4.

In an embodiment of the disclosure, the UE 320 or 330 may receive the information about the decoding mode including bit information corresponding to the number of perturbations from the BS 310. Furthermore, the UE 320 or 330 may receive a packet from the BS 310 on a PDSCH. Moreover, the UE 320 or 330 may decode the received packet based on the received information about the decoding mode.

For example, the BS 310 may use 2 bits to set decoding mode "00" corresponding to a default decoding mode for the first UE 320 and set decoding mode "01" corresponding to a maximum decoding mode for the second UE 330. The BS 310 may transmit a data packet to each of the first UE 320 and the second UE 330. Accordingly, the first UE 320 may decode the received data packet based on the default decoding mode "00," and the second UE 330 may decode the received data packet based on the maximum decoding mode "01." It is not, however, limited thereto, and there may be other various methods of setting a decoding mode.

Figure 4:
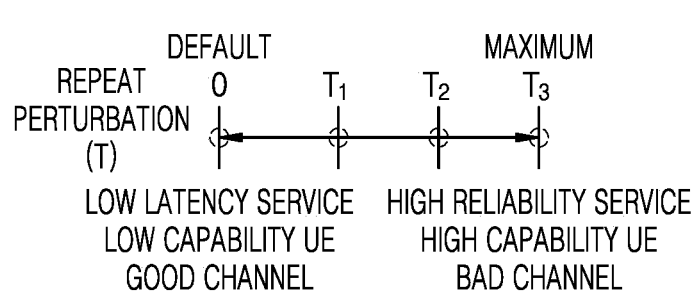
FIG. 4 illustrates a method of determining a perturbation mode, according to an embodiment of the disclosure.

FIG. 4 illustrates a method of determining a perturbation mode, according to an embodiment of the disclosure.

Referring to FIG. 4, the decoding mode may include a default decoding mode, a maximum perturbation decoding mode, a perturbation decoding mode, etc., but is not limited thereto and the decoding mode may include fewer or more types of decoding modes. In an embodiment of the disclosure, the default decoding mode may be a mode to perform BP decoding without perturbation decoding. For example, for a service having very short latency, a service having a low priority, a case of having a good transmission channel, or a case of decoding at a UE that does not support perturbation decoding, the default decoding mode may be set. The maximum perturbation decoding mode may be a mode in which to repeatedly perform as many perturbations as possible in each UE. For example, the maximum perturbation decoding mode may be set for a service supporting high reliability, a service having a high priority, or a case of having a poor transmission channel state. The perturbation decoding mode may be a mode in which the number of repetitions is divided into steps based on the maximum number of perturbation rounds. The perturbation decoding mode may include two decoding modes: the default decoding mode and the maximum decoding mode, or may include further fractionated decoding modes. In an embodiment of the disclosure, the number of modes and a setting criterion for the perturbation decoding mode may be flexibly determined based on the service information, UE information, data information, channel information, etc. For example, when the maximum number of perturbations is T3 and T1<T2<T3, 2-bit information about a decoding mode may be defined to have four decoding modes: "00" indicating a default decoding mode; "01" indicating that perturbation is to be repeated as many as T1; "10" indicating that perturbation is to be repeated as many as T2; "11" indicating that perturbation is to be repeated as many as T3. In another example, when the maximum number of perturbations is T3 and T1<T2<T3, 2-bit information about a decoding mode may be defined to have four decoding modes: "00" indicating a default decoding mode; "01" indicating that perturbation is to be repeated as many as T1 or less; "10" indicating that perturbation is to be repeated as many as T2 or less but more than T1; "11" indicating that perturbation is to be repeated as many as T3 or less but more than T2. It is not, however, limited thereto, and there may be other various methods of defining decoding modes.

Figure 5:
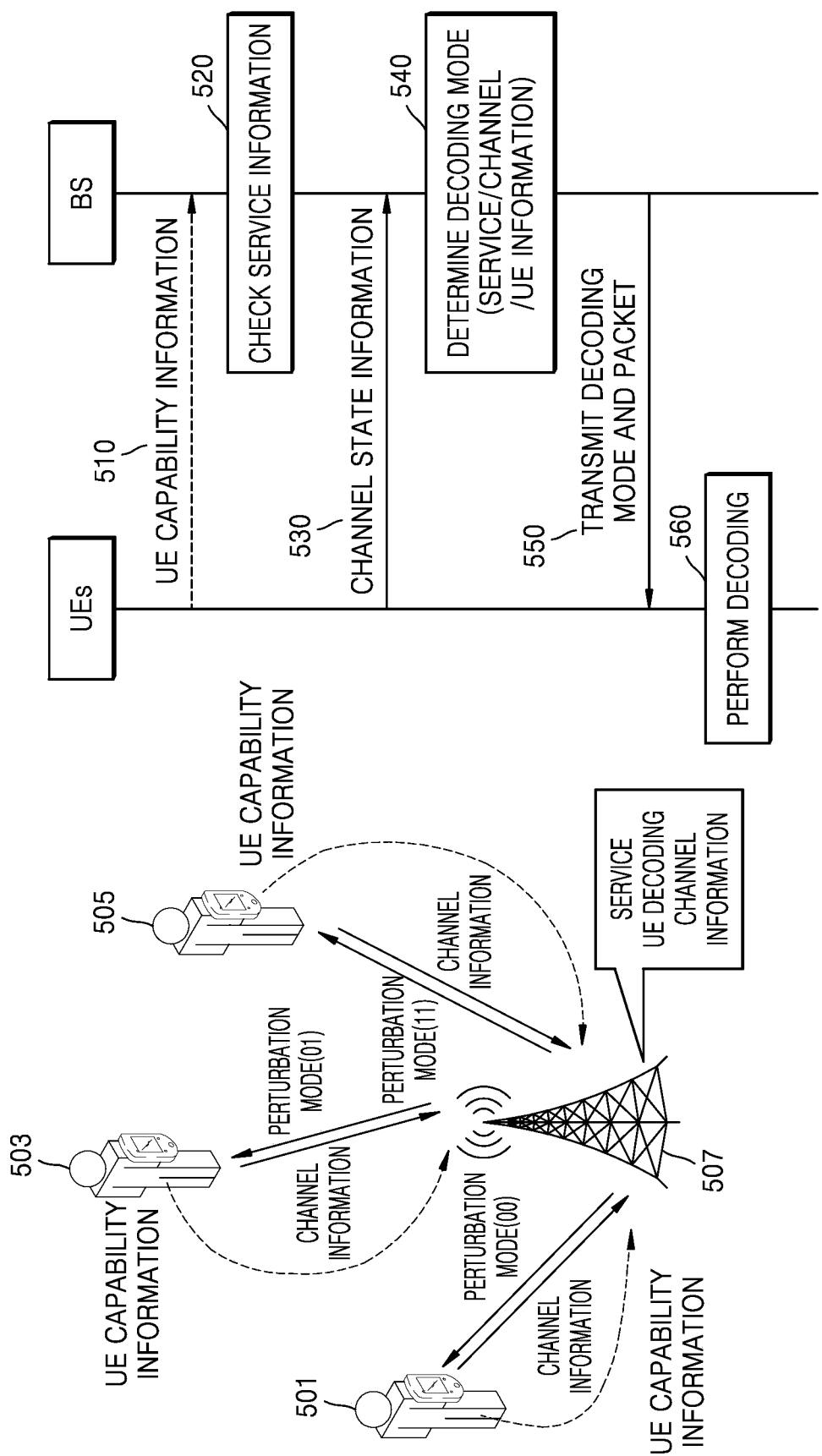
FIG. 5 illustrates a method in which a BS transmits and receives signals to and from UEs to determine a decoding mode, according to an embodiment of the disclosure.

FIG. 5 illustrates a method in which a BS transmits and receives signals to and from UEs to determine a decoding mode, according to an embodiment of the disclosure.

Referring to FIG. 5, a BS 507 may determine a decoding mode for each UE. In an embodiment of the disclosure, the BS 507 may collect information required for each UE to determine a decoding mode to be set for the UE. For example, the information required for each UE may include UE capability information, service information, channel state information, etc. In an embodiment of the disclosure, the BS 507 may obtain the UE capability information and the service information at a time when connected to the UE, and obtain the channel state information in a data transmission and reception procedure.

In operation 510, UEs 501, 503 and 505 may report their UE capability information to the BS 507. In an embodiment of the disclosure, the BS 507 may transmit UECapabilityEnquiry to a UE when the UE is connected to the BS. The UE may transmit information of the UE (UECapabilityInformation) depending on a set UE capability parameter based on the received UECapabilityEnquiry. The UE capability parameter may include a physical layer parameter and may be variously subdivided. Accordingly, the UE may add perturbation decoding capability information of the UE to the physical layer parameter, and may transmit, to the BS, the UE capability parameter including the perturbation decoding capability information of the UE.

In operation 520, the BS 507 may check the service information. In an embodiment of the disclosure, the service information may include information about a service priority such as QoS, packet delay requirement information, packet error probability requirement, etc., without being limited thereto.

For example, services for the first and second UEs 501 and 503 may require low latency, and services for the third UE 505 may require high reliability. Accordingly, the BS 507 may take into account a low-repetitive perturbation mode for the first and second UEs 501 and 503 and a high-repetitive perturbation mode for the third UE 505.

In operation 530, UEs 501, 503 and 505 may transmit channel state information to the BS 507. For example, the first UE 501 may transmit channel state information corresponding to a good channel condition to the BS 507, and the second UE 503 and the third UE 505 may transmit channel state information corresponding to a noisy channel condition to the BS 507.

In operation 540, the BS 507 may determine a decoding mode to be set for each UE based on the service information, the channel state information, the UE capability information, etc. In an embodiment of the disclosure, the BS 507 may use information received from each UE and information checked by the BS 507 itself to determine a decoding mode for the UE and set the determined decoding mode for the UE. For example, the BS 507 may set a default decoding mode for the first UE 501 based on service information requiring low latency and channel state information corresponding to a good channel. Furthermore, the BS 507 may set a decoding mode for the second UE 503 based on a channel state requiring low latency but having severe noise, the decoding mode indicating that perturbation is to be repeated up to N times. Moreover, the BS 507 may set a maximum decoding mode for the third UE 505 based on the service information requiring high reliability and a channel state of having severe noise.

In operation 550, the BS 507 may transmit information about the decoding mode and a data packet to each UE. In an embodiment of the disclosure, the BS 507 may add the determined decoding mode to configuration information, and transmit the configuration information to the UE. In this case, information about the decoding mode included in the configuration information may be added to a control signal including an MCS parameter of the data packet and transmitted to the UE from the BS 507. Furthermore, the BS 507 may transmit a data packet to the UE on a downlink channel. For example, the downlink channel may be a PDSCH on which to transmit or receive a data packet. Accordingly, the information about the decoding mode may be transmitted on a control channel and the data packet may be transmitted on a data channel, but it is not limited thereto. For example, both the information about the decoding mode and information about the data packet may be transmitted on the control channel or the data channel.

In operation 560, each UE may decode the data packet based on the received information about the decoding mode. For example, the first UE 501 may decode the data packet according to a decoding mode in which perturbation is repeated to the minimum based on the default decoding mode. The second UE 503 may perform decoding that repeats perturbation up to N times according to the decoding mode indicating that perturbation is to be repeated up to N times. The third UE 505 may decode the data packet based on the maximum number of perturbation rounds that the third UE 505 is able to perform.

Figure 6:
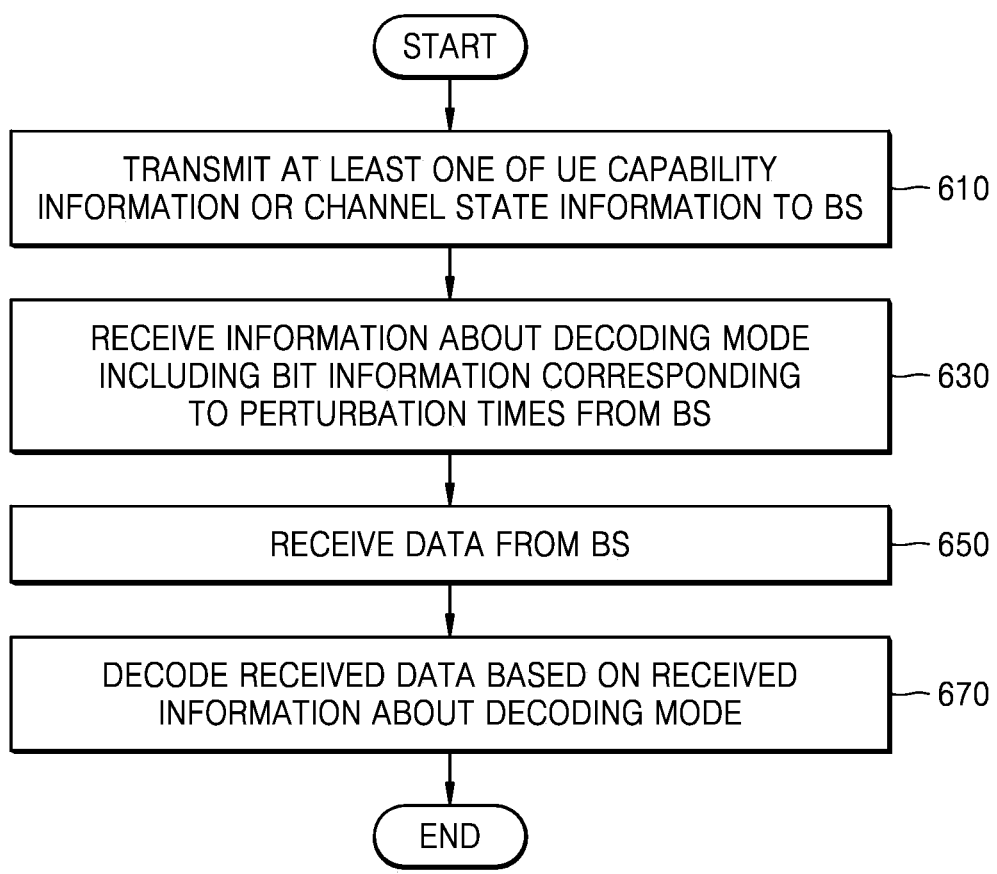
FIG. 6 is a flowchart illustrating a method in which a UE decodes data received from a BS, according to an embodiment of the disclosure.

FIG. 6 is a flowchart illustrating a method in which a UE decodes data received from a BS, according to an embodiment of the disclosure.

Referring to FIG. 6, in operation 610, a UE may transmit at least one of UE capability information or channel state information to a BS. In an embodiment of the disclosure, the UE capability information UECapabilityInformation may include decoding capability information. For example, the decoding capability information of the UE may include information about whether the UE has a decoder, whether the UE has a perturbation decoder, the maximum number of perturbations, etc. In an embodiment of the disclosure, the channel state information may generally refer to information that may represent quality of a radio channel generated between the UE and an antenna port. For example, the channel state information may include a rank indicator (RI), a precoding matrix indicator (PMI), a channel quality indicator (CQI), etc. The RI represents rank information, which refers to the number of streams received by the UE in the same time-frequency resource. A value of the RI may be determined depending on long-term fading of the channel, and may be fed back to the BS from the UE in a usually longer period than for the PMI or the CQI. The PMI is a value that reflects channel space characteristics, and indicates a precoding index preferred by the UE based on a metric such as an SINR. The CQI is a value that represents a channel intensity, commonly referring to a received SINR that may be obtained when the BS used the PMI.

In operation 630, the UE may receive information about a decoding mode including bit information corresponding to the number of perturbations from the BS. In an embodiment of the disclosure, the BS may determine a decoding mode including bit information corresponding to the number of perturbations, based on at least one of UE capability information or channel state information transmitted by the UE, and the UE may receive information about the determined decoding mode including the bit information corresponding to the number of perturbations. For example, the UE may receive the information about the decoding mode on a control channel, and set a decoding mode according to configuration information included in the information about the decoding mode.

In operation 650, the UE may receive data from the BS. For example, the UE may receive the data on a data channel (e.g., a PDSCH).

In operation 670, the UE may decode the received data, based on the received information about the decoding mode. For example, when the UE is configured with a maximum perturbation decoding mode but the UE keeps failing to decode the received data, the UE may decode the received data by repeating perturbation as many as the maximum number of perturbations. When the UE succeeds in decoding without repeating perturbation to the maximum number of times, the UE may complete decoding the received data.

Figure 7:
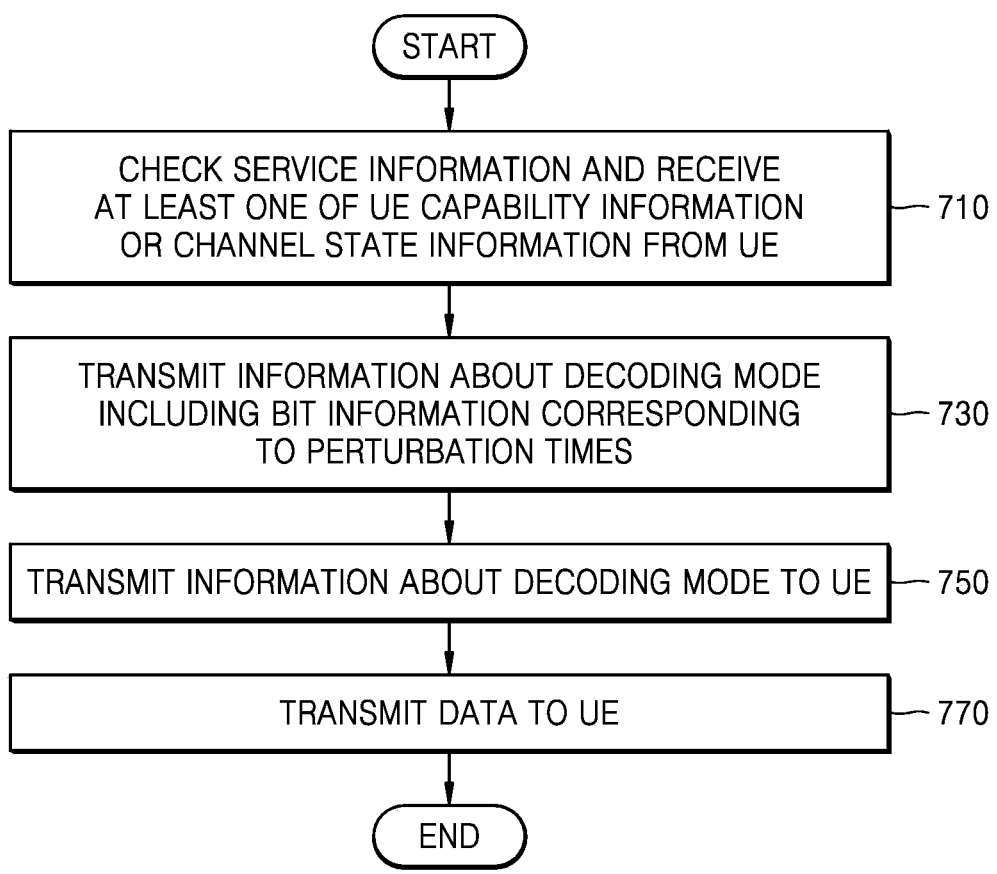
FIG. 7 is a flowchart illustrating a method in which a BS determines a decoding mode, according to an embodiment of the disclosure.

FIG. 7 is a flowchart illustrating a method in which a BS determines a decoding mode, according to an embodiment of the disclosure.

Referring to FIG. 7, in operation 710, a BS may check service information and receive at least one of UE capability information or channel state information from a UE. Major characteristics of 5G communication systems are to support various service scenarios having different requirements as compared with 4G communication systems. The requirements may refer to latency, a data rate, battery life, the number of concurrently connected users, communication coverage, etc. In an embodiment of the disclosure, the BS may check a service type such as an eMBB service, a URLL service, an mMTC service, etc., and a requirement of each service. Service types, requirements, and service information are not, however, limited thereto. The BS may check such service information and receive at least one of UE capability information or channel state information from the UE. This may correspond to the aforementioned operation 610 of FIG. 6.

In operation 730, the BS may generate information about a decoding mode including bit information corresponding to the number of perturbations. In an embodiment of the disclosure, the BS may determine a decoding mode including bit information corresponding to the number of perturbations, based on at least one of UE capability information or channel state information transmitted by the UE. Based on the determined decoding mode, the BS may generate information about the decoding mode. Operation 730 may correspond to the aforementioned operation 540 of FIG. 5.

In operation 750, the BS may transmit the information about the decoding mode to the UE. For example, the BS may transmit the information about the decoding mode to the UE on a control channel. Operation 750 may correspond to the aforementioned operation 630 of FIG. 6.

In operation 770, the BS may transmit data to the UE. In an embodiment of the disclosure, the BS may transmit data to be decoded in a decoding mode configured for the UE. Operation 770 may correspond to the aforementioned operation 650 of FIG. 6.

Figure 8:
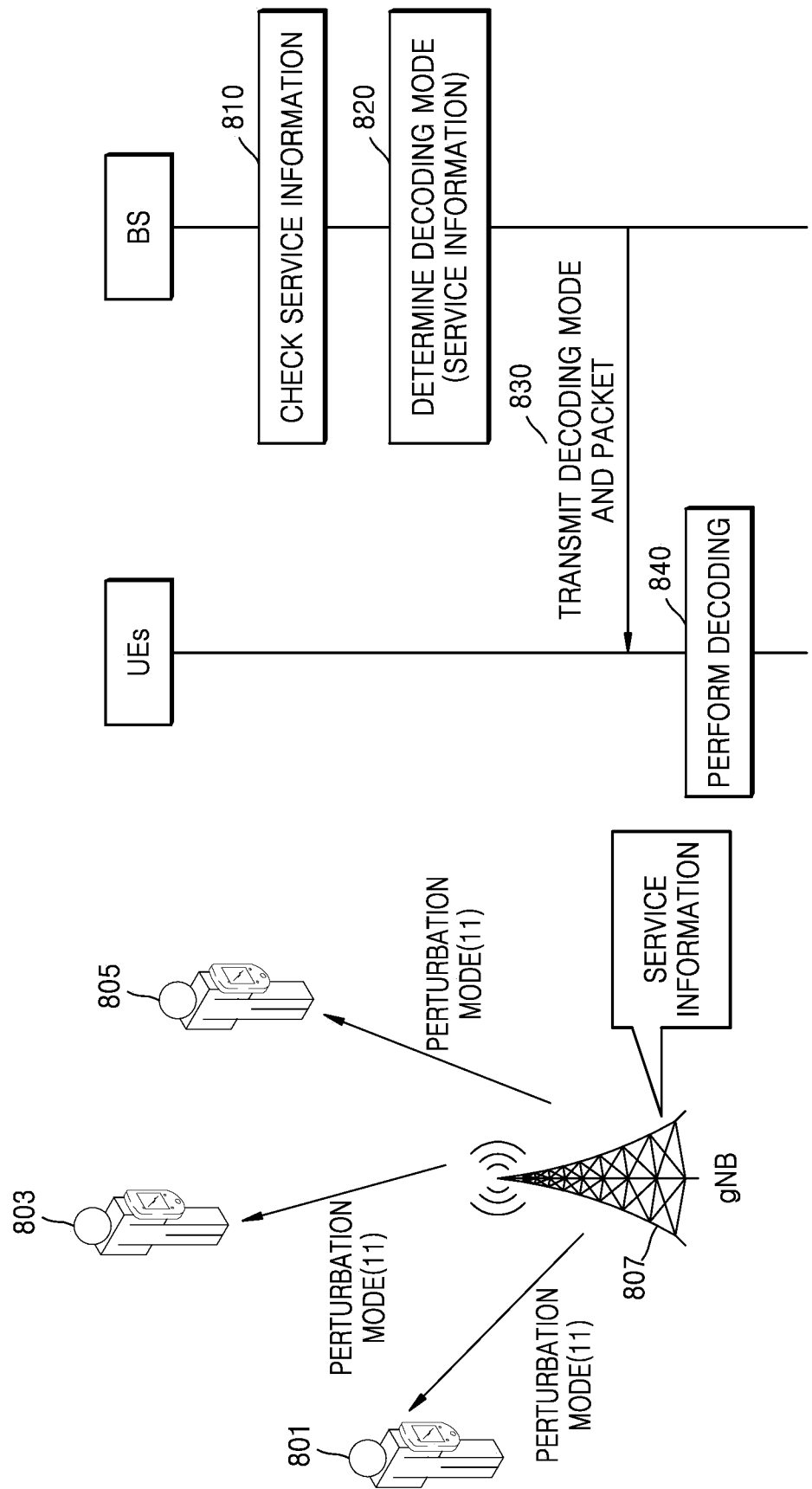
FIG. 8 illustrates a method in which a BS transmits and receives signals to and from UEs to determine a decoding mode, according to an embodiment of the disclosure.

FIG. 8 illustrates a method in which a BS transmits and receives signals to and from UEs to determine a decoding mode, according to an embodiment of the disclosure.

Referring to FIG. 8, a BS 807 may determine a decoding mode for UEs 801, 803 and 805 without information about the UEs 801, 803 and 805. In an embodiment of the disclosure, when the BS 807 is not able to obtain UE capability information or performs broadcasting transmission, the BS 807 may have to determine the decoding mode based on service information without having the UE capability information. For example, when the BS 807 is going to transmit an emergency alert message to the plurality of UEs 801, 803 and 805 in an emergency or disaster situation, the BS 807 may transmit the emergency alert message along with information about the decoding mode. In the case of the emergency alert message about a disaster situation, the BS 807 may have difficulty in re-transmitting the emergency alert message, the information about the decoding mode may include information about the maximum decoding mode.

In operation 810, the BS 807 may check the service information. In an embodiment of the disclosure, the service information may include information about a service priority such as QoS, packet latency, a packet error probability performance requirement, etc., information about a transmission method such as unicasting, multicasting, broadcasting, etc., or the like.

In operation 820, the BS 807 may determine a decoding mode based on the service information. For example, when the BS 807 is going to transmit an emergency alert message through broadcasting to the plurality of UEs 801, 803 and 805 in an emergency or disaster situation, the BS 807 may transmit the emergency alert message along with information about the decoding mode. In this case, the information about the decoding mode may include information about the maximum decoding mode. It is not, however, limited thereto, and there may be other various methods of determining a decoding mode.

In operation 830, the BS 807 may transmit the determined decoding mode and a packet to the UE. In an embodiment of the disclosure, the BS 807 may add the determined decoding mode to configuration information and transmit the configuration information on a control channel, and transmit the packet on a data channel. In another embodiment of the disclosure, the BS 807 may transmit both the configuration information including the decoding mode and the packet to the UE on the data channel. For example, in a case of broadcasting an emergency alert message, the BS 807 may have difficulty in transmitting a message to the UE several times, so the BS 807 may add the information about the decoding mode to the message and then transmit the message to the UE. In another embodiment of the disclosure, the BS 807 may transmit both the configuration information including the decoding mode and the packet to the UE on the control channel.

In operation 840, the UE may perform decoding based on the configured decoding mode. For example, when the UE receives the emergency alert message from the BS 807 through broadcasting, the UE may decode the emergency alert message based on the configuration information about a decoding mode included in the emergency alert message. When the decoding mode is the maximum decoding mode, the UE may repeatedly perform perturbation until the emergency alert message is decoded successfully, and when the UE keeps failing to decode the emergency alert message, the UE may repeat perturbation to the maximum number of perturbation times.

Figure 9:
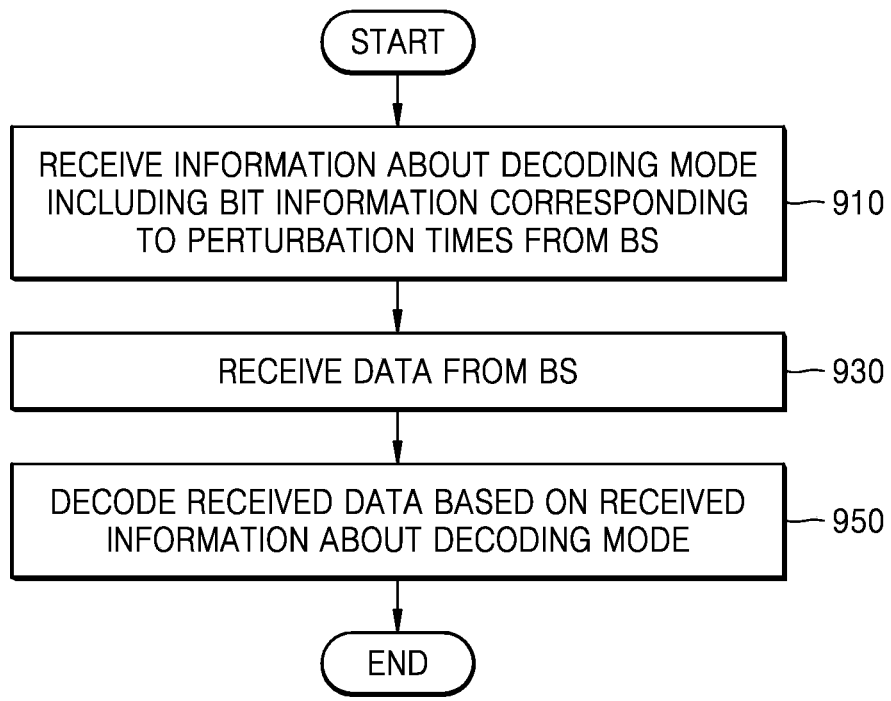
FIG. 9 is a flowchart illustrating a method in which a UE decodes data received from a BS, according to an embodiment of the disclosure.

FIG. 9 is a flowchart illustrating a method in which a UE decodes data received from a BS, according to an embodiment of the disclosure.

Referring to FIG. 9, in operation 910, the UE may receive information about a decoding mode including bit information corresponding to the number of perturbations from the BS. In an embodiment of the disclosure, the information about a decoding mode may be generated by the BS based on service information.

In operation 930, the UE may receive data from the BS. In an embodiment of the disclosure, the UE may receive the data along with the information about the decoding mode, or receive the data and the information about the decoding mode separately. Operations 910 and 930 may correspond to the aforementioned operation 830 of FIG. 8.

In operation 950, the UE may decode the received data, based on the received information about the decoding mode. Operation 950 may correspond to the aforementioned operation 840 of FIG. 8.

Figure 10:
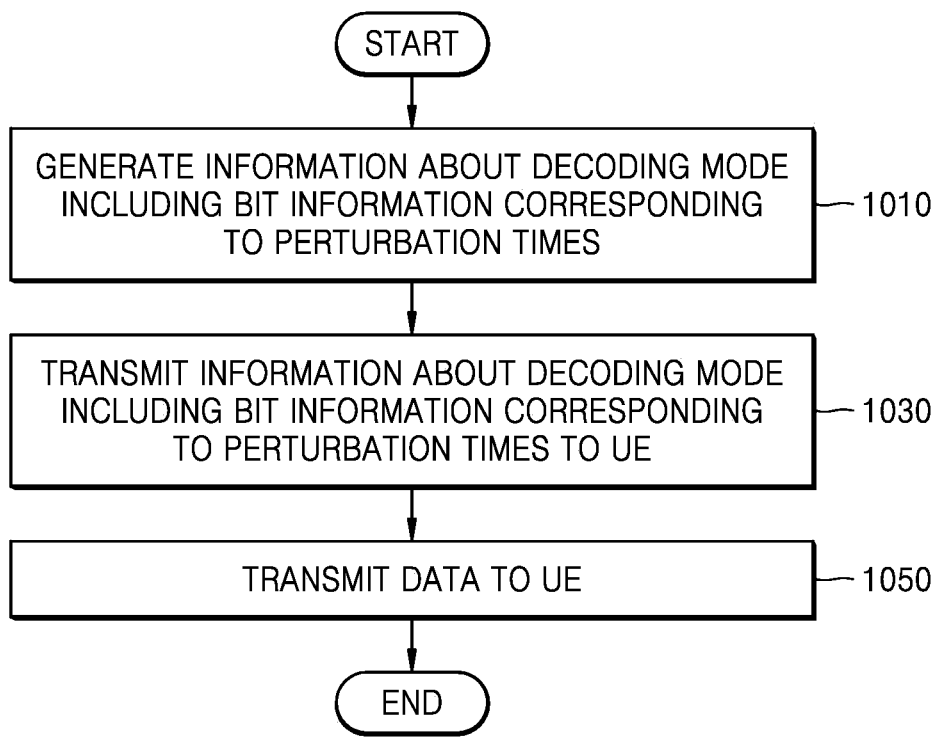
FIG. 10 is a flowchart illustrating a method in which a BS determines a decoding mode, according to an embodiment of the disclosure.

FIG. 10 is a flowchart illustrating a method in which a BS determines a decoding mode, according to an embodiment of the disclosure.

Referring to FIG. 10, in operation 1010, the BS may generate information about a decoding mode including bit information corresponding to the number of perturbations. In an embodiment of the disclosure, the BS may generate information about a decoding mode based on service information. Operation 1010 may correspond to the aforementioned operation 820 of FIG. 8.

In operation 1030, the BS may transmit the information about the decoding mode including the bit information corresponding to the number of perturbations, which is generated in operation 1010, to the UE. Operation 1030 may correspond to the aforementioned operation 910 of FIG. 9.

In operation 1050, the BS may transmit data to the UE. In an embodiment of the disclosure, the BS may transmit the data along with the information about the decoding mode, or transmit the data and the information about the decoding mode separately. Operations 1030 and 1050 may correspond to the aforementioned operation 830 of FIG. 8.

Figure 11:
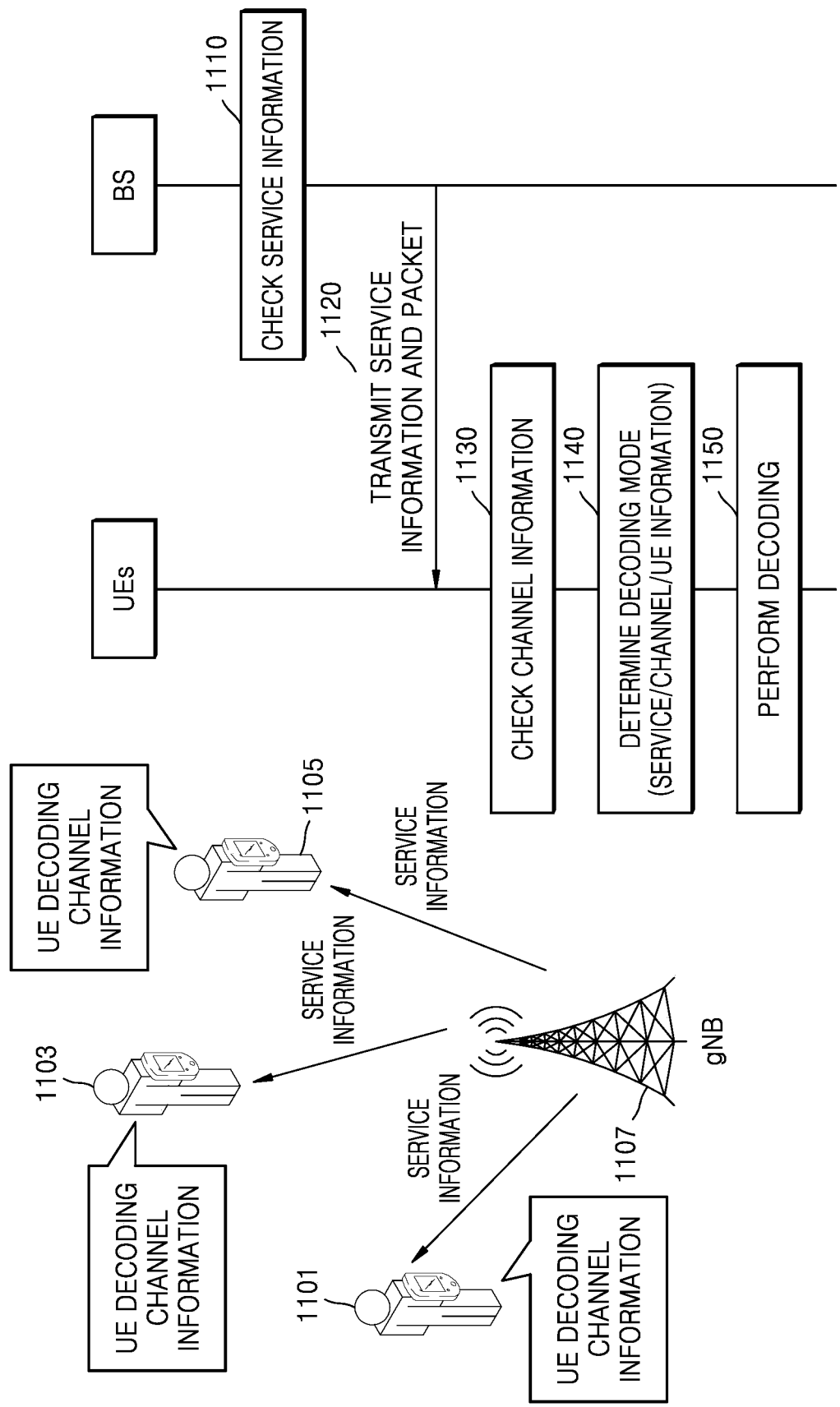
FIG. 11 illustrates a method in which a UE transmits and receives signals to and from a BS to determine a decoding mode, according to an embodiment of the disclosure.

FIG. 11 illustrates a method in which a UE transmits and receives signals to and from a BS to determine a decoding mode, according to an embodiment of the disclosure.

Referring to FIG. 11, UEs 1101, 1103 and 1105 may determine a decoding mode by themselves based on service information received from a BS 1107. In an embodiment of the disclosure, the UEs 1101, 1103 and 1105 may determine their decoding modes by taking into account their UE capability information, channel state information, etc., along with the received service information, and decode the data based on the determined decoding mode.

In operation 1110, the BS may check the service information. For example, the service information may include information about a service such as eMBB, mMTC, URLLC or the like, information about a requirement of each service, information about a transmission scheme such as unicasting, multicasting, broadcasting, etc., without being limited thereto.

In operation 1120, the BS may transmit the service information and a packet to the UE. In an embodiment of the disclosure, the BS may transmit the service information and the packet together or separately. Furthermore, the BS may transmit the service information and the packet on a data channel, or on a control channel, or on the control channel and the data channel, respectively.

In operation 1130, the UE may check channel information. In an embodiment of the disclosure, the channel information may include a channel state information (CSI). In an embodiment of the disclosure, the channel state information may generally refer to information that may represent quality of a radio channel generated between the UE and an antenna port. For example, the channel state information may include an RI, a PMI, a CQI, etc.

In operation 1140, the UE may determine a decoding mode based on the service information, the channel information, the UE information, etc. In an embodiment of the disclosure, the UE may determine a decoding mode based on at least one of the service information, the channel information, or the UE information. For example, when the channel state is not good, the UE may determine the maximum decoding mode in which perturbation may be repeated as many as the maximum number of perturbations. In another example, for a service requiring low latency, the UE may determine the decoding mode to be the default decoding mode. In still another example, when the UE has no perturbation decoder, the UE may determine the decoding mode to be the default decoding mode.

In operation 1150, the UE may perform decoding based on the determined decoding mode. For example, when the decoding mode is determined to be the maximum decoding mode, the UE may repeat perturbation until an earlier time of when decoding is successful and when perturbation has been repeated the maximum number of times. It is not, however, limited thereto, and there may be other various methods of performing decoding based on a decoding mode.

Figure 12:
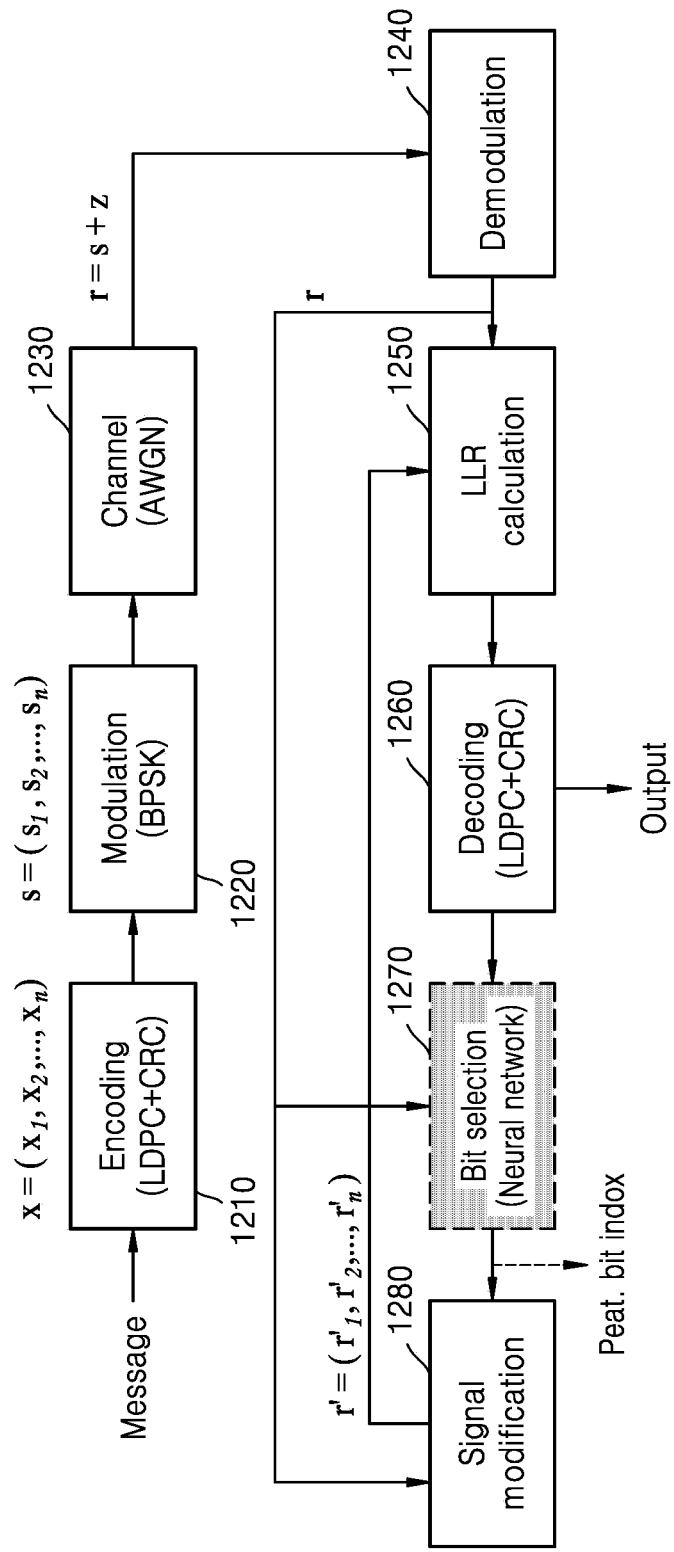
FIG. 12 is a flowchart illustrating a decoding method using an artificial neural network, according to an embodiment of the disclosure.

FIG. 12 is a flowchart illustrating a decoding method using an artificial neural network, according to an embodiment of the disclosure.

Referring to FIG. 12, an encoding performer 1210 of a transmitter may encode a message. In an embodiment of the disclosure, the encoding performer 1210 may correspond to the aforementioned encoding performer 110 of FIG. 1. Various modulation schemes may be applied by a modulation performer 1220 to a codeword $x=(x_1, x_2, \ldots, x_n)$ generated as a result of the encoding. The modulation performer 1220 may correspond to the aforementioned modulation performer 1220 of FIG. 1. In an embodiment of the disclosure, the transmitter may transmit a symbol $s=(s_1, s_2, \ldots, s_n)$, to which a modulation scheme is applied, to a receiver on a transmission channel 1230. The receiver may then receive a signal $r=s+z$, which is the symbol to which the modulation scheme is applied, plus noise from the transmission channel 1230. For example, the transmission channel 1230 may be an AWGN channel. In this case, z may be a Gaussian noise vector with dimension n, mean 0, and variance $\sigma^2$. However, the transmission channel is not limited thereto.

In an embodiment of the disclosure, a demodulation performer 1240 of the receiver may demodulate the received signal and transmit the demodulated signal to an LLR calculation performer 1270, a bit selector 1270, and a signal modifier 1280. The LLR calculation performer 1250 may correspond to the aforementioned LLR calculation performer 150 of FIG. 1. Furthermore, a decoding performer 1260 may output a final signal when decoding is successful, or may deliver the signal to the bit selector 1270 when the decoding is not successful.

In an embodiment of the disclosure, the bit selector 1270 may include an artificial neural network. The bit selector 1270 may select a perturbation region using an artificial neural network trained with received signals and information of bit indexes for which perturbation decoding is successful. The perturbation region may refer to a set of symbol indexes to be subject to perturbation. Using the artificial neural network, the bit selector 1270 may estimate confidences of the received signal, arrange bit indexes of the received signal in low confidence order based on the estimated confidences, and determine a perturbation region. For example, N bits in the low confidence order may be selected for the perturbation region. In this case, decoding performance may depend on the method of selecting the perturbation region. Hence, an embodiment of the disclosure provides a new method of selecting a perturbation region using an artificial neural network and a deep learning scheme. In the method, a correct perturbation decoding success rate per bit in the received signal may be estimated, so that the decoding performance is enhanced and the number of perturbation rounds may be reduced.

In an embodiment of the disclosure, the bit selector 1270 may deliver information of the bits selected using the artificial neural network to the signal modifier 1280, which may in turn modify the signal of the selected bits. The modified signal may be decoded back.

Figure 13A:
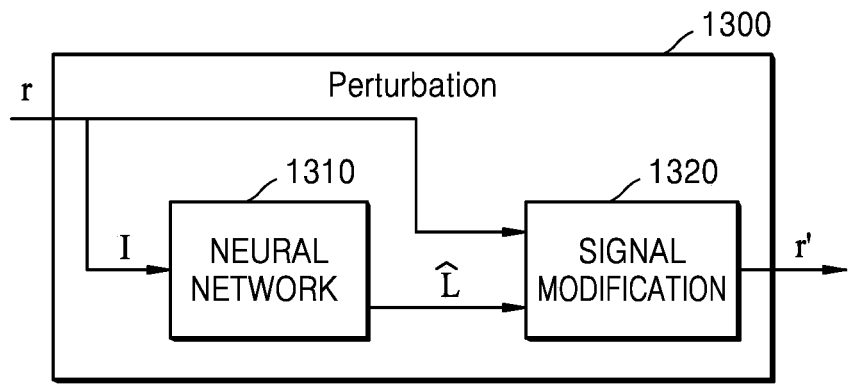
FIG. 13A is a block diagram illustrating a method of performing perturbation based on a received signal using an artificial neural network, according to an embodiment of the disclosure.

FIG. 13A is a block diagram illustrating a method of performing perturbation based on a received signal using an artificial neural network, according to an embodiment of the disclosure.

Referring to FIG. 13A, a perturbation performer 1300 may include an artificial neural network 1310 and a signal modifier 1320. In an embodiment of the disclosure, the artificial neural network 1310 may determine a perturbation region based on a received signal. Received signal r may be entered to the artificial neural network 1310 as input signal I. That is, $I=(r_1, r_2, \ldots, r_N)$. The artificial neural network 1310 may be trained to output vector $L=(L_1, \ldots, L_N)$ that represents a perturbation region as defined earlier, i.e., index positions of bits for which perturbation decoding is successful. The output $L=(L_1, \ldots, L_N)$ of the artificial neural network 1310 may be entered to the signal modifier 1320 so that the perturbation region determined by the artificial neural network 1310 may be subject to signal modification.

In an embodiment of the disclosure, the neural network for selecting the perturbation region may be trained based on supervised learning. For the supervised learning, training data comprised of the input data I to the neural network and a label L that serves as a correct answer for the input data I may be required. In an embodiment of the disclosure, provided is a method of generating training data (input data, a label, etc.) with which to train the neural network used to select the perturbation region. In an embodiment of the disclosure, the method of the generating may depend on the structure of LDPC codes. For example, method 1 and method 2, which will be described later, may be applied to regular LDPC codes and irregular LDPC codes, respectively, without being limited thereto. In an embodiment of the disclosure, the training data may be regularly generated according to an energy per bit to noise density ratio (Eb/No) in an operational Eb/No region.

A perturbation decoding method will now be described using an impulsive perturbation technique. With the technique, the perturbation bit is reversed only in the opposite direction, which is easy for a classification issue of a neural network. The impulsive perturbation technique is merely an example of the perturbation technique, and other various techniques may be used in embodiments of the disclosure.

Method 1.

An input signal of training data may be the received signal r when decoding of an LDPC code and/or a CRC code fails. A label of the training data may be generated using information of bit indexes for which 1-bit impulsive perturbation decoding on the received signal r is successful. A specific method of generating a training data label may use algorithm 1. For the received signal r for which decoding on LDPC and/or CRC codes fails, 1-bit perturbation may be applied to each bit of the whole received symbols. In this case, indexes of bits for which perturbation decoding is successful may be represented as a binary vector L. Specifically, as elements of L, value "1" may be placed in a position of an index of a bit for which perturbation decoding is successful and value "0" may be placed in a position of an index of a bit for which perturbation decoding fails. For example, assuming that bits of a signal having a code length of 10 bits ($r_1, \ldots, r_{10}$), for which decoding is successful, are ($r_1, r_4, r_8$), a label may be L=(1,0,0,1,0,0,0,1,0,0). This makes it possible to obtain label L corresponding to r. Accordingly, a total of $d_{train}$ training data pairs may be obtained. TABLE 1 shows an algorithm 1 for embodiments according to the present disclosure.

TABLE 1

Algorithm 1

Algorithm 1: generate a label input: r = ($r_1, \ldots, r_N$) (received signal r for which LDPC decoding or CRC check has failed)
output: L = ($L_1, \ldots, L_N$)
1: L = ($L_1, \ldots, L_N$) ← (0, ... , 0)
2: for i = 1, ... , N
3: r' ← r
4: $r'_j$ ← sgn($r_j$)A, (impulsive perturbation)
5: LLR calculation and decoding of r'
6: if LDPC decoding is successful and CRC check is successful, then $L_i$ ← 1
7: else $L_i$ ← 0
8: end if
9: end for Method 2.

Method 2 may be a method of generating training data applied to irregular LDPC codes. Algorithm 2 is a procedure of generating a label, which may be similar to Method 1. A difference between algorithm 1 and algorithm 2 lies in the inputs to the algorithms and their sixth lines. Algorithm 2 may put not "1" but $b_i$ to an element of the label for the perturbation region for which perturbation decoding is successful. $b_i$ is a function of an order of an i-th variable node. For example, when the order of the i-th variable node is equal to or less than a reference value, a value greater than 1 may be put to the element, and otherwise, the value of 1 may be put to the element. $b_i$ is not, however, limited thereto, and there may be various values for $b_i$. With this procedure, training data with a weighted label may be generated. TABLE 2 shows an algorithm 2 for embodiments according to the present disclosure.

TABLE 2

Algorithm 2

Algorithm 2: generate a weighted label for irregular LDPC codes input: r = ($r_1, \ldots, r_N$) (received signal r for which LDPC decoding or CRC check has failed), b
output: L = ($L_1, \ldots, L_N$)
1: L = ($L_1, \ldots, L_N$) ← (0, ... , 0)
2: for i = 1, ... , N
3: r' ← r
4: $r'_j$ ← sgn($r_j$)A, (impulsive perturbation)
5: LLR calculation and decoding of r'
6: if LDPC decoding is successful and CRC check is successful, then $L_i$ ← $b_i$
7: else $L_i$ ← 0
8: end if
9: end for FIG. 13B is a block diagram illustrating a method of performing perturbation based on a received signal and a post decoding soft syndrome (PDSS) using an artificial neural network, according to an embodiment of the disclosure.

Figure 13B:
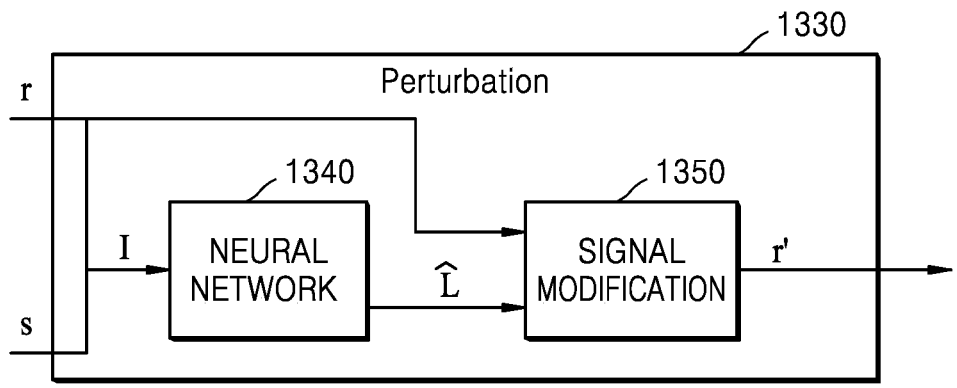
FIG. 13B is a block diagram illustrating a method of performing perturbation based on a received signal and a post decoding soft syndrome (PDSS) using an artificial neural network, according to an embodiment of the disclosure.

Referring to FIG. 13B, a perturbation performer 1330 may include an artificial neural network 1340 and a signal modifier 1350. In an embodiment of the disclosure, the artificial neural network 1340 may determine a perturbation region using a received signal and a PDSS. For example, the artificial neural network 1340 may determine a perturbation region by concatenating a received signal and a PDSS. In this case, an input to the artificial neural network 1340 may be I=(r,s)=($r_1, \ldots, r_N, s_1, \ldots, s_{N-K}$). In an embodiment of the disclosure, the artificial neural network 1340 may be trained to output vector L=($L_1, \ldots L_N$) that represents index positions of bits for which perturbation decoding is successful. s=($s_1, \ldots, s_{N-K}$) is the PDSS, which is defined as follows:

$$s_i = \min_{j \in M(i)} |r_j| \prod_{j \in M(i)} \text{sign}(r_i)$$

In the above equation, M(i) is a set of variable nodes connected to the i-th check node. The soft syndrome may include information about whether the received signal is a codeword, confidence information of discrimination, etc. The trained artificial neural network 1340 may select a perturbation region for a received signal determined to have a failure in LDPC and/or CRC decoding, and output a perturbation success probability $\hat{L}=(\hat{L}_1, \ldots, \hat{L}_N)$ for each bit. The signal modifier 1350 may use the output from the artificial neural network 1340 to modify the signal and generate final perturbation-modified signal r'=($r'_1, \ldots, r'_N$).

In an embodiment of the disclosure, the neural network for selecting the perturbation region may be trained based on supervised learning. For the supervised learning, training data comprised of the input data I to the neural network and a label L that serves as a correct answer for the input data I may be required. In an embodiment of the disclosure, provided is a method of generating training data (input data, a label, etc.) with which to train the neural network used to select the perturbation region. In an embodiment of the disclosure, the method of the generating may depend on the structure of LDPC codes. For example, method 1 and method 2, which will be described later, may be applied to regular LDPC codes and irregular LDPC codes, respectively, without being limited thereto. In an embodiment of the disclosure, the training data may be regularly generated according to an Eb/No in an operational Eb/No region.

A perturbation decoding method will now be described using an impulsive perturbation technique. With the technique, the perturbation bit is reversed only in the opposite direction, which is easy for a classification issue of a neural network. The impulsive perturbation technique is merely an example of the perturbation technique, and other various techniques may be used in embodiments of the disclosure.

Method 2.

An input signal of training data may be I=[rs] resulting from concatenation of the received signal r and PDSS s when decoding of an LDPC code and/or a CRC code fails. A label of the training data may be generated using information of bit indexes for which 1-bit impulsive perturbation decoding on the received signal r is successful. A specific method of generating a training data label may use algorithm 3. For the received signal r for which decoding on LDPC and/or CRC codes fails, 1-bit perturbation may be applied to each bit of the whole received symbols. In this case, indexes of bits for which perturbation decoding is successful may be represented as a binary vector L. Specifically, as elements of L, value "1" may be placed in a position of an index of a bit for which perturbation decoding is successful and value "0" may be placed in a position of an index of a bit for which perturbation decoding fails. For example, assuming that bits of a signal having a code length of 10 bits $(r_1, \ldots, r_{10})$, for which decoding is successful, are $(r_1, r_4, r_8)$, a label may be L=(1,0,0,1,0,0,0,1,0,0). This makes it possible to obtain label L corresponding to r. Accordingly, a total of $d_{train}$ training data pairs may be obtained. TABLE 3 shows an algorithm 2 for embodiments according to the present disclosure.

TABLE 3

Algorithm 3

Algorithm 3: generate a label input: I = $(r_1, \ldots , r_N, S_1, \ldots ,S_{N-K})$ (received signal r for which LDPC decoding or CRC check has failed)
output: L = $(L_1, \ldots , L_N)$
1: L = $(L_1, \ldots , L_N) \leftarrow (0, ..., 0)$
2: for i = 1, ... , N
3: r' ← r
4: $r'_j \leftarrow sgn(r_j)A$, (impulsive perturbation)
5: LLR calculation and decoding of r'
6: if LDPC decoding is successful and CRC check is successful, then $L_i \leftarrow 1$
7: else $L_i \leftarrow 0$
8: end if
9: end for Method 2

Method 2 may be a method of generating training data applied to irregular LDPC codes. Algorithm 2 is a procedure of generating a label, which may be similar to Method 1. A difference between algorithm 3 and algorithm 4 lies in the inputs to the algorithms and their sixth lines. Algorithm 4 may put not "1" but $b_i$ to an element of the label for the perturbation region for which perturbation decoding is successful. $b_i$ is a function of an order of an i-th variable node. For example, when the order of the i-th variable node is equal to or less than a reference value, a value greater than 1 may be put to the element, and otherwise, the value of 1 may be put to the element. $b_i$ is not, however, limited thereto, and there may be various values for $b_i$. With this procedure, training data with a weighted label may be generated. TABLE 4 shows an algorithm 2 for embodiments according to the present disclosure.

TABLE 4

Algorithm 4

Figure 14:
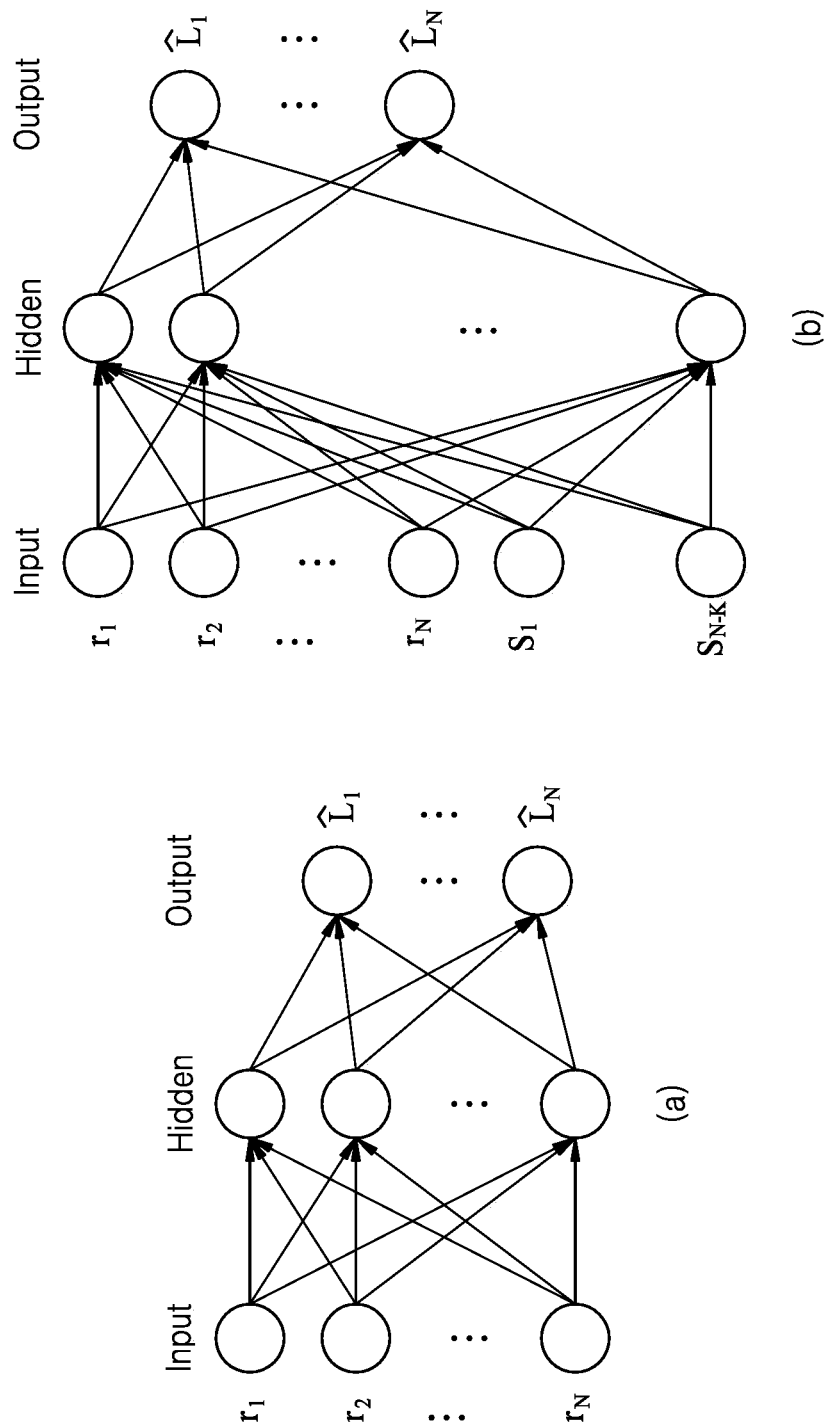
FIG. 14 illustrates a structure of an artificial neural network, according to an embodiment of the disclosure.

Algorithm 4: generate a weighted label for irregular LDPC codes input: I = $(r_1, \ldots , r_N, S_1, \ldots ,S_{N-K})$ (received signal r for which LDPC decoding or CRC check has failed), b
output: L = $(L_1, \ldots , L_N)$
1: L = $(L_1, \ldots , L_N) \leftarrow (0, ..., 0)$
2: for i = 1, ... , N
3: r' ← r
4: $r'_j \leftarrow sgn(r_j)A$, (impulsive perturbation)
5: LLR calculation and decoding of r'
6: if LDPC decoding is successful and CRC check is successful, then $L_i \leftarrow b_i$
7: else $L_i \leftarrow 0$
8: end if
9: end for FIG. 14 illustrates a structure of an artificial neural network, according to an embodiment of the disclosure.

In an embodiment of the disclosure, a neural network may have any of various structures such as recurrent neural network (RNN), long short-term memory models (LSTM), multi-layer perceptron (MLP), etc. However, for low complexity and low latency operations, a neural network having the MLP structure comprised of one hidden layer will now be described. It is not, however, limited thereto, and other various structures may be used.

Referring to FIG. 14A, a structure of an artificial neural network for determining a perturbation region with a received signal is shown. The neural network of FIG. 14A may correspond to the aforementioned artificial neural network 1310 of FIG. 13A. In the neural network of FIG. 14A, there may be N input layer nodes and N hidden layer nodes. There may be N outputs from the neural network, which represent positions in the signal to be modified. In an embodiment of the disclosure, an activation function may use a rectified linear unit (ReLU) for a hidden layer and a linear function (y=x) for an output. A loss function may use a mean square error (MSE), and adaptive moment estimation (Adam) may be used for optimization.

Referring to FIG. 14B, a structure of an artificial neural network for determining a perturbation region with a received signal and a PDSS is shown. The neural network of FIG. 14B may correspond to the aforementioned artificial neural network 1340 of FIG. 13B. In the neural network of FIG. 14B, there may be 2N−K input layer nodes and 2N−K hidden layer nodes. There may be N outputs from the neural network, which represent positions in the signal to be modified. In an embodiment of the disclosure, an activation function may use a ReLU for a hidden layer and a linear function (y=x) for an output. A loss function may use an MSE, and Adam may be used for optimization.

Figure 15:
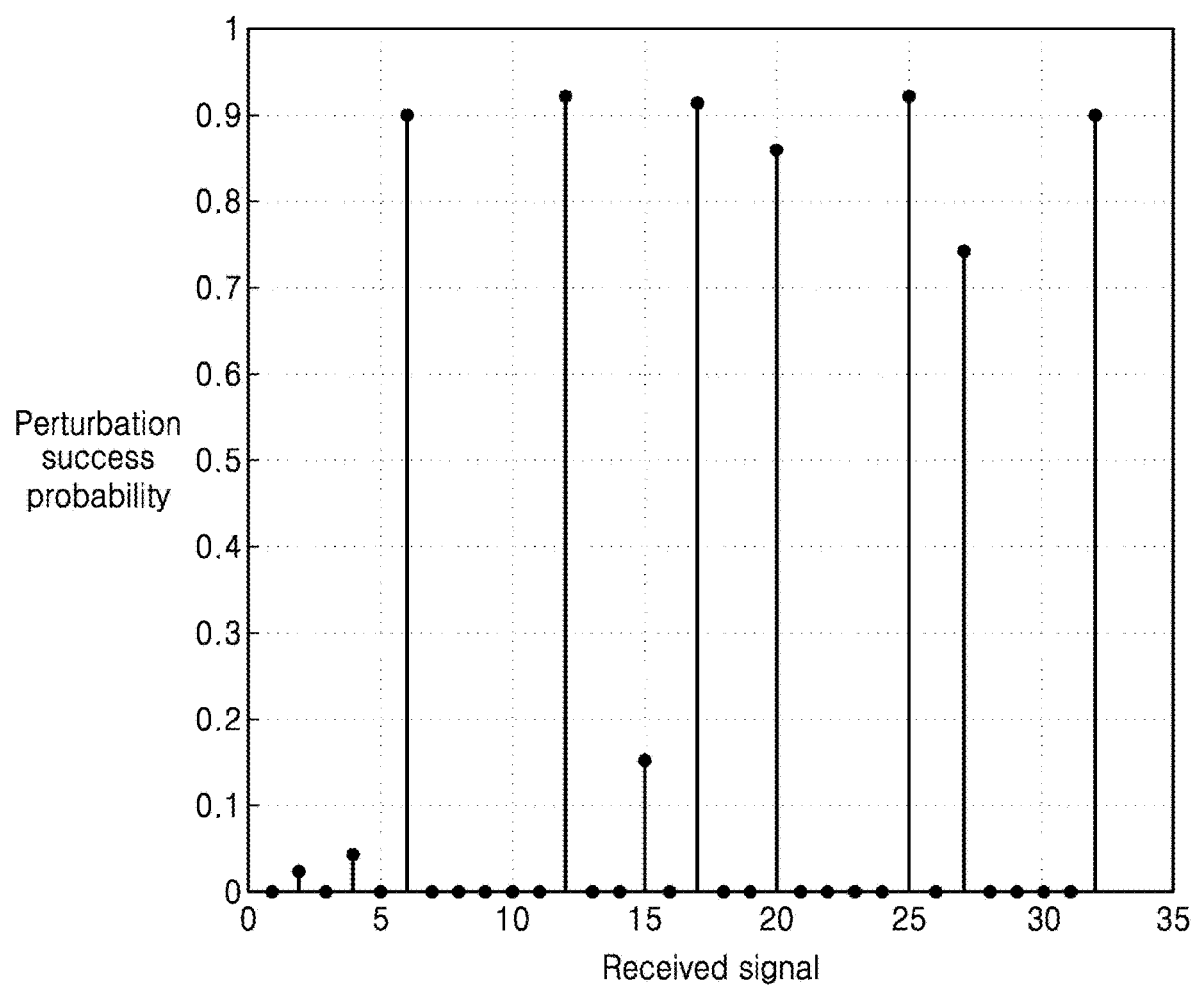
FIG. 15 illustrates perturbation success probabilities of a result of selecting a perturbation region using an artificial neural network, according to an embodiment of the disclosure.

FIG. 15 illustrates perturbation success probabilities of a result of selecting a perturbation region using an artificial neural network, according to an embodiment of the disclosure.

In an embodiment of the disclosure, a trained neural network may output a relative perturbation decoding success probability per bit of a received signal as shown in FIG. 15. In this case, the higher the value, the higher the decoding success probability when the impulsive perturbation is applied. The trained neural network may select Q large values from among output values, and select the Q large values for a perturbation region. When the majority of nodes have the same output values, a bit index order or a priority per bit may be randomly determined.

Figure 16:
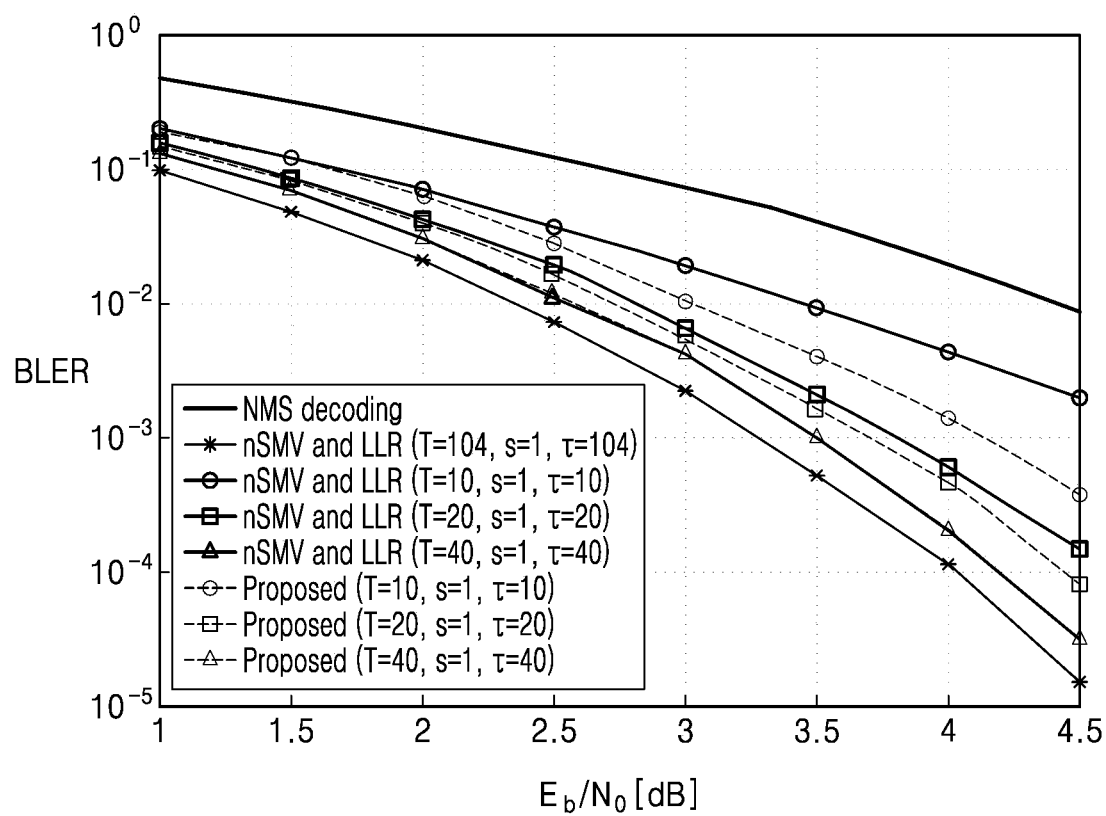
FIG. 16 illustrates decoding performances based on perturbation region selection techniques, according to an embodiment of the disclosure.

FIG. 16 illustrates decoding performances of perturbation region selection techniques, according to an embodiment of the disclosure.

Referring to FIG. 16, decoding performance of impulsive perturbation, to which a neural network based perturbation technique is applied, according to an embodiment of the disclosure is shown. In an embodiment of the disclosure, a perturbation region selected using a neural network has good performance even with a small number of perturbation rounds. FIG. 16 shows results of comparing impulsive perturbation performance between using a neural network and using a perturbation region selection criterion using nSMV and intrinsic LLR. A simulation environment is as in the following TABLE 5.

TABLE 5

| Simulation environment | |
|---|---|
| (n, k) - LDPC code | (104, 20) |
| BP decoding | Normalized min-sum (scaling =0.78) |
| Maximum number of BP repetitions | 20 |
| Perturbation technique | Impulsive perturbation |
| Perturbation region selection criterion | nSMV + LLR/NN |
| Impulsive perturbation (T, s, τ) | (10,1,10), (20,1,20), (40,1,40) |
| NN structure | MLP (104-104-104) |
| Activation function | Leak Relu (hidden), linear (output) |
| Loss function | MSE |
| Optimizer | Adam |
| Training data per Eb/N0 | 100,000 |
| Test data per Eb/N0 | 10,000 |
| Training Eb/N0 [dB] | (1.0,2.0,...4.0) |
| Test Eb/N0 [dB] | (1.0,1.5,...4.5) |
| Epoch/mini-batch | 100/100 |

Figure 17:
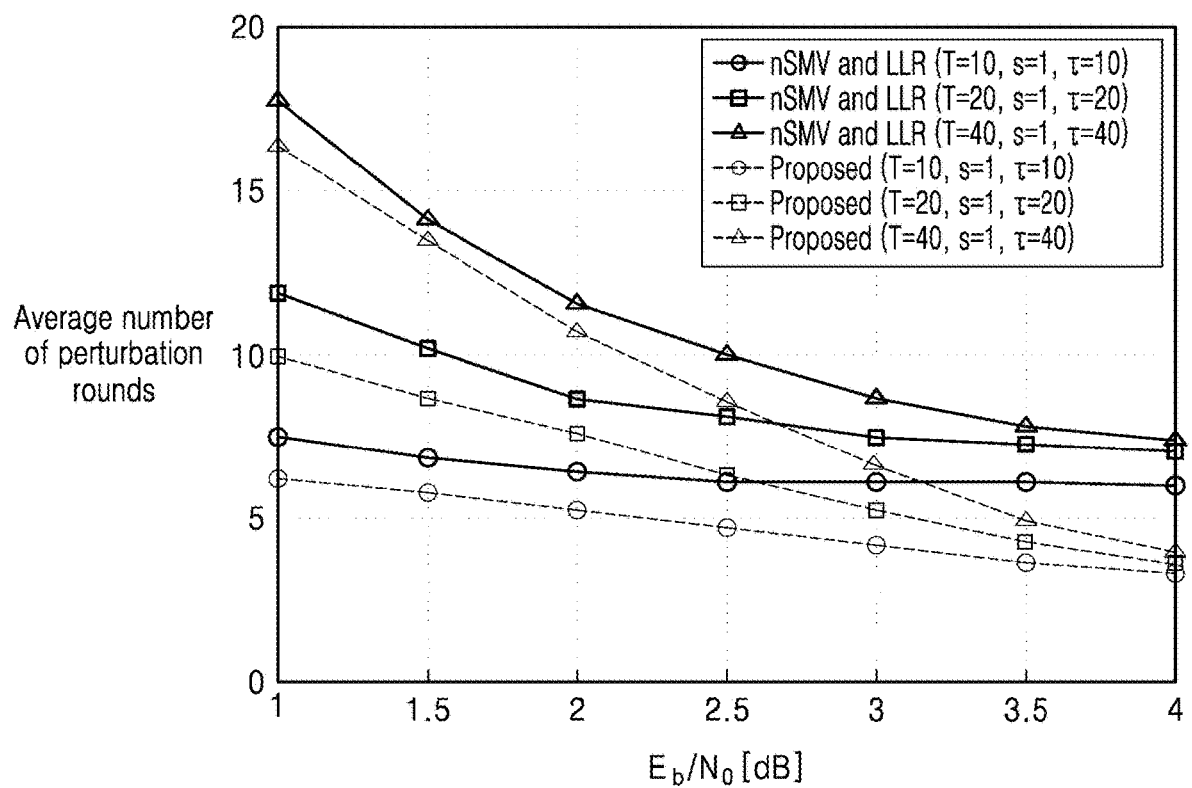
FIG. 17 illustrates average number of perturbation rounds based on perturbation region selection schemes, according to an embodiment of the disclosure.

FIG. 17 illustrates average number of perturbation rounds based on perturbation region selection techniques, according to an embodiment of the disclosure.

Referring to FIG. 17, decoding performance of impulsive perturbation, to which a neural network based perturbation technique is applied, according to an embodiment of the disclosure is shown. For training data, $I=(r,s)=(r_1, \ldots, r_N, s_1, \ldots, s_{N-K})$ resulting from concatenation of a received signal and a PDSS is used for an input, and a label generation algorithm is used for a label. When the number of perturbation rounds is 10, a technique provided herein using a neural network has 0.7 dB of performance gain, and when the number of perturbation rounds is 20, the technique has 0.15 dB of performance gain, as compared with the existing technique. Although the decoding performance is almost equal for 40 perturbation rounds, it may be seen that the number of perturbation rounds is averagely reduced.

Figure 18:
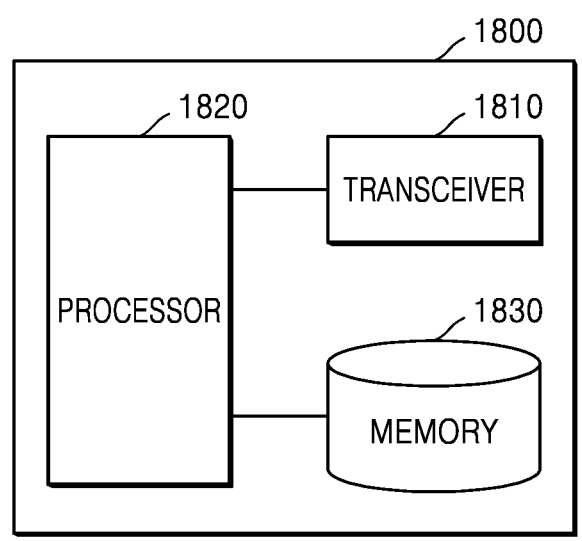
FIG. 18 illustrates a BS according to an embodiment of the disclosure.

FIG. 18 illustrates a BS, according to an embodiment of the disclosure.

Referring to FIG. 18, a BS 1800 may include a transceiver 1810, a processor 1820, and a memory 1830. The transceiver 1810, the processor 1820, and the memory 1830 of the BS 1800 may operate according to the aforementioned communication method of the BS 1800. Components of the BS are not, however, limited thereto. For example, the BS may include more or fewer elements than described above. In addition, the transceiver 1810, the processor 1820, and the memory 1830 may be implemented in a single chip. The processor 1820 may include one or more processors.

A receiver and a transmitter of the BS 1800 are collectively called the transceiver 1810, which may transmit or receive signals to or from a UE or a network entity. The signals to be transmitted to or received from the UE or the network entity may include control information and data. For this, the transceiver 1810 may include an RF transmitter for up-converting the frequency of a signal to be transmitted and amplifying the signal and an RF receiver for low-noise amplifying a received signal and down-converting the frequency of the received signal. It is merely an example of the transceiver 1810, and the elements of the transceiver 1810 are not limited to the RF transmitter and RF receiver.

In addition, the transceiver 1810 may receive a signal on a wireless channel and output the signal to the processor 1820, or transmit a signal output from the processor 1820 on a wireless channel.

The memory 1830 may store a program and data required for an operation of the BS. Furthermore, the memory 1830 may store control information or data included in a signal obtained by the BS. The memory 1830 may include a storage medium such as a read only memory (ROM), a random access memory (RAM), a hard disk, a compact disc ROM (CD-ROM), and a digital versatile disk (DVD), or a combination of storage mediums. Alternatively, the memory 1830 may not be separately present but integrated into the processor 1820.

The processor 1820 may control a series of processes for the BS to be operated according to embodiments of the disclosure. For example, the processor 1820 may receive control signals and data signals through the transceiver 1810 and process the received control signals and data signals. The processor 1820 may transmit the processed control signal and data signal through the transceiver 1810. The processor 1820 may configure downlink control information (DCI) including allocation information of a PDSCH and control related components to transmit the DCI.

Figure 19:
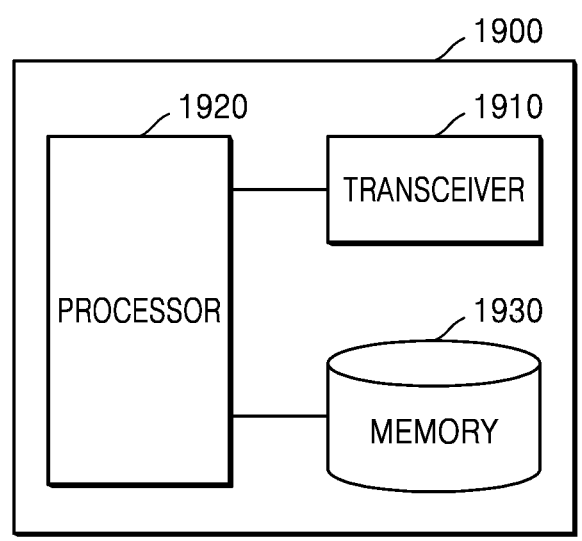
FIG. 19 illustrates a UE according to an embodiment of the disclosure.

FIG. 19 illustrates a UE, according to an embodiment of the disclosure.

Referring to FIG. 19, a UE 1900 may include a transceiver 1910, a processor 1920, and a memory 1930. Components of the UE 1900 are not, however, limited thereto. For example, the UE 1900 may include more or fewer elements than described above. In addition, the transceiver 1910, the processor 1920, and the memory 1930 may be implemented in a single chip.

The processor 1920 may include one or more processors. The one or more processors may include a universal processor such as a central processing unit (CPU), an application processor (AP), a digital signal processor (DSP), etc., a dedicated graphic processor such as a graphics processing unit (GP), a vision processing unit (VPU), etc., or a dedicated AI processor such as a neural processing unit (NPU). When the one or more processors are the dedicated AI processors, they may be designed in a hardware structure that is specific to dealing with a particular AI model.

The processor 1920 may control a series of processes for the UE to be operated according to embodiments of the disclosure. For example, the processor 1920 may receive control signals and data signals through the transceiver 1910 and process the received control signals and data signals. The processor 1920 may transmit the processed control signal and data signal through the transceiver 1910. Furthermore, the processor 1920 may control input data derived from the received control signal and data signal to be processed according to a predefined operation rule or artificial intelligence (AI) model stored in the memory 1930.

The predefined operation rule or the AI model may be made by training. Specifically, the predefined operation rule or the AI model being made by training refers to the predefined operation rule or the AI model established to perform a desired feature (or an object) being made when a basic AI model is trained by a training algorithm with a lot of training data. Such training may be performed by the UE itself in which AI is performed according to the disclosure, or by a separate server and/or system. Examples of the learning algorithm may include supervised learning, unsupervised learning, semi-supervised learning, or reinforcement learning, without being limited thereto.

The AI model may include a plurality of neural network layers. Each of the plurality of neural network layers may have a plurality of weight values, and perform neural network operation through operation between an operation result of the previous layer and the plurality of weight values. The plurality of weight values owned by the plurality of neural network layers may be optimized by training results of the AI model. For example, the plurality of weight values may be updated to reduce or minimize a loss value or a cost value obtained by the AI model during a training procedure. An artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, without being limited thereto.

In an embodiment of the disclosure, the processor 1920 may receive information about decoding mode including bit information corresponding to the number of perturbations from a BS, receive data from the BS on a PDSCH and decode the received data based on the received information about the decoding mode.

In an embodiment of the disclosure, the processor 1920 may transmit at least one of UE capability information or channel state information to a BS.

In an embodiment of the disclosure, the processor 1920 may perform decoding by repeatedly performing as many perturbations as the number of perturbations corresponding to the bit information.

In an embodiment of the disclosure, the processor 1920 may determine that decoding has failed, perform perturbation on at least one bit determined by using an artificial neural network, as a result of the determination that decoding has failed, and perform the decoding based on a result of performing the perturbation.

In an embodiment of the disclosure, the processor 1920 may perform decoding or CRC check on a regular LDPC code using the received data and when determining that the decoding has failed, obtain the data for which the decoding has failed.

In an embodiment of the disclosure, the processor 1920 may perform decoding or CRC check on a non-uniform LDPC code using the received data and when determining that the decoding has failed, obtain the data for which the decoding has failed, and perform impulsive perturbation on at least one bit of the data for which the decoding has failed, and determine a reference value to be compared with an order of a variable node based on a structure of the irregular LDPC code.

The memory 1930 may store a program and data required for operation of the UE 1900. Furthermore, the memory 1930 may store control information or data included in a signal obtained by the UE 1900. Furthermore, the memory 1930 may store control information or data included in a signal obtained by the UE 1900. The memory 1930 may include a storage medium such as a ROM, a RAM, a hard disk, a CD-ROM, and a DVD, or a combination of storage mediums. Alternatively, the memory 1930 may not be separately present but integrated into the processor 1920.

The transceiver 1910 may refer to a transmitter and a receiver, and the transceiver 1910 of the UE 1900 may transmit or receive signals to or from a BS or a network entity. The transmitted or received signals may include control information and data. For this, the transceiver 1910 may include an RF transmitter for up-converting the frequency of a signal to be transmitted and amplifying the signal and an RF receiver for low-noise amplifying a received signal and down-converting the frequency of the received signal. It is merely an example of the transceiver 1910, and the elements of the transceiver 1910 are not limited to the RF transmitter and RF receiver. In addition, the transceiver 1910 may receive a signal on a wireless channel and output the signal to the processor 1920, or transmit a signal output from the processor 1920 on a wireless channel.

Some embodiments of the disclosure may be implemented in the form of a computer-readable recording medium that includes computer-executable instructions such as the program modules executed by the computer. The computer-readable recording medium may be an arbitrary available medium that may be accessed by the computer, including volatile, non-volatile, removable, and non-removable mediums. The computer-readable recording medium may also include a computer storage medium. The volatile, non-volatile, removable, and non-removable mediums may be implemented by an arbitrary method or technology for storage of information, such as computer-readable instructions, data structures, program modules, or other data.

Embodiments of the disclosure may be implemented with a software program including instructions stored in a computer-readable storage medium.

The computer is a device capable of calling out instructions stored in a storage medium and operating under the instructions as in embodiments of the disclosure, and may include an electronic device according to embodiments of the disclosure.

The computer-readable storage medium may be provided in the form of a non-transitory storage medium. The term "non-transitory" only means that the storage medium is tangible without including a signal, but does not help distinguish any data stored semi-permanently or temporarily in the storage medium.

Furthermore, the control methods according to embodiments of the disclosure may be included and provided in a computer program product. The computer program product may be a commercial product that may be traded between a seller and a buyer.

The computer program product may include a software program and a computer-readable storage medium having the software program stored thereon. For example, the computer program product may include a product in the form of a software program that is electronically distributed by the manufacturer of the device or by an electronic market (e.g., Google play Store™, or App Store™). For the electronic distribution, at least a portion of the software program may be stored in a storage medium or arbitrarily generated. In this case, the storage medium may be one of a servers of the manufacturer or of a relay server that temporarily stores the software program.

In a system including a server and a device, the computer program product may include a storage medium of the server or a storage medium of the device. Alternatively, when there is a third device (e.g., a smart phone) communicatively connected to the server or the device, the computer program product may include a storage medium of the third device. In another example, the computer program product may be transferred from the server to the device or the third party, or may include a software program itself that is transferred from the third device to the device.

In this case, one of the server, the device, or the third device may execute the computer program product to perform the method according to embodiments of the disclosure. Alternatively, two or more of the server, the device, or the third device may execute the computer program product to perform the method according to embodiments of the disclosure in a distributed fashion.

For example, the server (e.g., a cloud server or an artificial intelligence (AI) server) may execute the computer program product stored therein to control the device communicatively connected to the server to perform the method according to embodiments of the disclosure.

In yet another example, the third device may execute the computer program product to control the device communicatively connected to the third device to perform the method according to embodiments of the disclosure. In the case that the third device executes the computer program product, the third device may download the computer program product and execute the downloaded computer program product. Alternatively, the third device may execute the computer program product that is preloaded to perform the method according to embodiments of the disclosure.

In the specification, the term "module" may refer to a hardware component such as a processor or a circuit, and/or a software component executed by the hardware component such as the processor.

Several embodiments have been described, but a person of ordinary skill in the art will understand and appreciate that various modifications can be made without departing the scope of the disclosure. Thus, it will be apparent to those of ordinary skill in the art that the disclosure is not limited to embodiments described, but can encompass not only the appended claims but the equivalents. For example, an element described in the singular form may be implemented as being distributed, and elements described in a distributed form may be implemented as being combined.

Although the present disclosure has been described with various embodiments, various changes and modifications may be suggested to one skilled in the art. It is intended that the present disclosure encompass such changes and modifications as fall within the scope of the appended claims.

What is claimed is:

1. A user equipment (UE) in a wireless communication system, the UE comprising:
    a transceiver; and
    at least one processor operable connected to the transceiver,
    the at least one processor configured to:
        control the transceiver to receive, from a base station (BS), information for a decoding mode including bit information corresponding to a number of perturbations,
        control the transceiver to receive, from the BS, data on a physical downlink shared channel (PDSCH),
        after performing a code redundancy check (CRC) or decoding a regular low-density parity-check (LDPC) code using the received data and determining that the decoding has failed, obtain the data for which the decoding has failed,
        perform perturbation on at least one bit determined by using an artificial neural network based on a determination that the decoding has failed, and
        perform decoding based on a result of the perturbation,
    wherein the information for the decoding mode is generated based on service information including at least one of quality of service (QoS), a service priority, packet delay performance, packet error probability performance, a requirement, or a data transmission scheme, and
    wherein the artificial neural network is trained by adding an index value to a position of a bit on which the decoding has been successful as a result of performing impulsive perturbation on at least one bit of the data for which the decoding has failed.

2. The UE of claim 1, wherein the at least one processor is further configured to control the transceiver to transmit, to the BS, at least one of UE capability information or channel state information, and
    wherein the information for the decoding mode is generated by the BS based on the at least one of the UE capability information or the channel state information.

3. The UE of claim 1, wherein the at least one processor is further configured to perform decoding by repeatedly performing as many perturbations as the number of perturbations corresponding to the bit information.

4. The UE of claim 2, wherein the UE capability information comprises at least one of information for whether the UE includes a perturbation decoder or a maximum number of perturbation rounds that the UE is able to perform.

5. The UE of claim 1, wherein the at least one processor is further configured to:
    after performing a CRC check or decoding an irregular LDPC code using the received data and determining that the decoding has failed, obtain the data for which the decoding has failed;
    perform an impulsive perturbation on at least one bit of the data for which the decoding has failed; and
    determine a reference value to be compared with an order of a variable node based on a structure of the irregular LDPC code, and
    wherein the artificial neural network is trained by adding an index value determined according to a result of comparison between the order of the variable node and the reference value to a position of a bit on which the decoding has been successful as a result of performing the impulsive perturbation on at least one bit of the data for which the decoding has failed.

6. A method of a user equipment (UE) in a wireless communication system, the method comprising:
    receiving, from a base station (BS), information for a decoding mode including bit information corresponding to a number of perturbations;
    receiving, from the BS, data on a physical downlink shared channel (PDSCH);
    after performing a code redundancy check (CRC) or decoding a regular low-density parity-check (LDPC) code using the received data and determining that the decoding has failed, obtaining the data for which the decoding has failed;
    performing perturbation on at least one bit determined by using an artificial neural network based on a determination that the decoding has failed; and
    performing decoding based on a result of the perturbation,
    wherein the information for the decoding mode is generated based on service information including at least one of quality of service (QoS), a service priority, packet delay performance, packet error probability performance, a requirement, or a data transmission scheme, and wherein the artificial neural network is trained by adding an index value to a position of a bit on which the decoding has been successful as a result of performing impulsive perturbation on at least one bit of the data for which the decoding has failed.

7. The method of claim 6, further comprising transmitting, to the BS, at least one of UE capability information or channel state information, wherein the information for the decoding mode is generated by the BS based on the at least one of the UE capability information or the channel state information.

8. The method of claim 7, wherein the UE capability information comprises at least one of information for whether the UE includes a perturbation decoder or a maximum number of perturbation rounds that the UE is able to perform.

9. The method of claim 6, wherein performing the decoding based on the received information for the decoding mode comprises performing decoding by repeatedly performing as many perturbations as the number of perturbations corresponding to the bit information.

10. The method of claim 6, wherein determining that the decoding has failed comprises, after performing a CRC check or decoding an irregular LDPC code using the received data and determining that the decoding has failed, obtaining the data for which the decoding has failed, wherein the method further comprises:
performing an impulsive perturbation on at least one bit of the data for which the decoding has failed; and
determining a reference value to be compared with an order of a variable node based on a structure of the irregular LDPC code, and wherein the artificial neural network is trained by adding an index value determined according to a result of comparison between the order of the variable node and the reference value to a position of a bit on which the decoding has been successful as a result of performing the impulsive perturbation on at least one bit of the data for which the decoding has failed.

* * * * *